US012632989B2

(12) United States Patent
Wu et al.

(10) Patent No.: US 12,632,989 B2
(45) Date of Patent: May 19, 2026

(54) CAMERA CALIBRATION

(71) Applicant: NVIDIA Corporation, Santa Clara, CA (US)

(72) Inventors: Yue Wu, Mountain View, CA (US); Cheng-Chieh Yang, Seattle, WA (US); Kang Wang, Hefei (CN); Ayon Sen, Santa Clara, CA (US); Hsin Miao, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 350 days.

(21) Appl. No.: 18/349,779

(22) Filed: Jul. 10, 2023

(65) Prior Publication Data

US 2025/0022175 A1 Jan. 16, 2025

(51) Int. Cl.
G06T 7/80 (2017.01)
G06T 7/73 (2017.01)
H04N 13/246 (2018.01)

(52) U.S. Cl.
CPC .................. G06T 7/85 (2017.01); G06T 7/73 (2017.01); H04N 13/246 (2018.05); G06T 2207/30244 (2013.01)

(58) Field of Classification Search
CPC ............. G06T 7/85; G06T 2207/10021; G06T 2207/10012; H04N 13/246; H04N 13/239; H04N 2013/0081
See application file for complete search history.

(56) References Cited

U.S. PATENT DOCUMENTS

| | | | | |
|---|---|---|---|---|
| 8,427,537 | B2 * | 4/2013 | Rouzes ..................... | G06T 7/73 |
| | | | | 348/140 |
| 9,384,551 | B2 * | 7/2016 | Ramaswamy ............ | G06T 7/85 |
| 9,729,858 | B2 * | 8/2017 | Livyatan ................ | G06V 20/56 |
| 9,866,820 | B1 * | 1/2018 | Agrawal .............. | H04N 13/239 |
| 9,886,759 | B2 * | 2/2018 | Lin .......................... | G06T 7/593 |
| 10,097,811 | B2 * | 10/2018 | Liu ....................... | H04N 13/239 |
| 10,097,812 | B2 * | 10/2018 | Livyatan ................ | G06F 18/22 |

(Continued)

OTHER PUBLICATIONS

T. Dang, C. Hoffmann, and C. A. Stiller, "Continuous Stereo Self-Calibration by Camera Parameter Tracking," Jul. 2009, IEEE Transactions on Image Processing, vol. 18, No. 7, pp. 1536-1550, (Year: 2009).*

*Primary Examiner* — Chiawei Chen
(74) *Attorney, Agent, or Firm* — IRON SUMMIT IP LLP

(57) ABSTRACT

In various examples, sensor calibration for autonomous or semi-autonomous systems and applications is described herein. Systems and methods are disclosed that calibrate image sensors, such as cameras, using images captured by the image sensors at different time instances. For instance, a first image sensor may generate first image data representing at least two images and a second image sensor may generate second image data representing at least one image. One or more feature points may then be tracked between the images represented by the first image data and the image represented by the second image data. Additionally, the feature point(s), timestamps associated with the images, poses associated with image sensors (e.g., poses of a vehicle), and/or other information may be used to determine one or more values of one or more parameters that calibrate the first image sensor with the second image sensor.

20 Claims, 17 Drawing Sheets

IMAGE 302(1)  IMAGE 302(2)  IMAGE 302(3)

FEATURE POINT 306(1)  FEATURE POINT 306(2)  TRACK 308  FEATURE POINT 306(3)

(56)  References Cited

U.S. PATENT DOCUMENTS

| | | | | |
|---|---|---|---|---|
| 10,489,912 | B1 * | 11/2019 | Brailovskiy | H04N 13/204 |
| 10,587,863 | B2 * | 3/2020 | Eshima | H04N 7/18 |
| 10,897,575 | B2 | 1/2021 | Wheeler et al. | |
| 11,887,338 | B2 * | 1/2024 | Leeman | G06T 7/80 |
| 2015/0145965 | A1 * | 5/2015 | Livyatan | G06F 18/22 |
| | | | | 348/47 |
| 2015/0381964 | A1 * | 12/2015 | Drouot | G06T 7/85 |
| | | | | 348/47 |
| 2017/0019657 | A1 * | 1/2017 | Livyatan | G06V 20/56 |
| 2017/0180706 | A1 * | 6/2017 | Salvagnini | H04N 13/246 |
| 2017/0223340 | A1 * | 8/2017 | Salvagnini | H04N 13/271 |
| 2017/0339397 | A1 * | 11/2017 | Livyatan | H04N 25/531 |
| 2017/0341583 | A1 * | 11/2017 | Zhang | H04N 7/181 |
| 2019/0244378 | A1 * | 8/2019 | Dong | G06T 5/80 |
| 2021/0003712 | A1 | 1/2021 | Zhang et al. | |
| 2021/0241541 | A1 * | 8/2021 | Kasuya | G06T 7/73 |
| 2022/0092814 | A1 * | 3/2022 | Eberspach | G06T 7/85 |
| 2025/0259319 | A1 * | 8/2025 | Zhou | G01S 13/931 |

* cited by examiner

700

DETERMINE, BASED AT LEAST ON FIRST IMAGE DATA GENERATED USING A FIRST IMAGE SENSOR OF A MACHINE, THAT A FIRST FEATURE POINT OF A FIRST IMAGE REPRESENTED BY THE FIRST IMAGE DATA CORRESPONDS TO A SECOND FEATURE POINT OF A SECOND IMAGE REPRESENTED BY THE FIRST IMAGE DATA
B702

DETERMINE, BASED AT LEAST ON THE FIRST IMAGE DATA AND SECOND IMAGE DATA GENERATED USING A SECOND IMAGE SENSOR OF THE MACHINE, THAT THE SECOND FEATURE POINT OF THE SECOND IMAGE CORRESPONDS TO A THIRD FEATURE POINT OF A THIRD IMAGE REPRESENTED BY THE SECOND IMAGE DATA
B704

DETERMINE, BASED AT LEAST ON THE FIRST FEATURE POINT OF THE FIRST IMAGE, THE SECOND FEATURE POINT OF THE SECOND IMAGE, AND THE THIRD FEATURE POINT OF THE THIRD IMAGE, ONE OR MORE VALUES OF ONE OR MORE PARAMETERS FOR CALIBRATING THE FIRST IMAGE SENSOR WITH THE SECOND IMAGE SENSOR
B706

RECEIVE FIRST IMAGE DATA GENERATED USING A FIRST IMAGE SENSOR AND SECOND IMAGE DATA GENERATED USING A SECOND IMAGE SENSOR, THE FIRST IMAGE DATA REPRESENTING A FIRST IMAGE AND A SECOND IMAGE AND THE SECOND IMAGE DATA REPRESENTING A THIRD IMAGE
B802

DETERMINE, BASED AT LEAST ON THE FIRST IMAGE DATA AND THE SECOND IMAGE DATA, A COST ASSOCIATED WITH ONE OR MORE VALUES OF ONE OR MORE PARAMETERS FOR CALIBRATING THE FIRST IMAGE SENSOR WITH THE SECOND IMAGE SENSOR
B804

DETERMINE, BASED AT LEAST ON THE COST, TO USE THE ONE OR MORE VALUES OF THE ONE OR MORE PARAMETERS FOR CALIBRATING THE FIRST IMAGE SENSOR WITH THE SECOND IMAGE SENSOR
B806

DETERMINE, BASED AT LEAST ON FIRST IMAGE DATA GENERATED USING A FIRST IMAGE SENSOR AND SECOND IMAGE DATA GENERATED USING A SECOND IMAGE SENSOR, THAT A FIRST FEATURE POINT OF A FIRST IMAGE REPRESENTED BY THE FIRST IMAGE DATA CORRESPONDS TO A SECOND FEATURE POINT OF A SECOND IMAGE REPRESENTED BY THE SECOND IMAGE DATA
B902

DETERMINE, BASED AT LEAST ON ONE OR MORE VALUES OF ONE OR MORE PARAMETERS AND THE FIRST FEATURE POINT, A LINE ASSOCIATED WITH THE SECOND IMAGE
B904

DETERMINE, BASED AT LEAST ON THE SECOND FEATURE POINT AND THE LINE, THAT THE ONE OR MORE VALUES OF THE ONE OR MORE PARAMETERS CALIBRATE THE FIRST IMAGE SENSOR WITH THE SECOND IMAGE SENSOR
B906

MEMORY
1104

I/O COMPONENTS
1114

CPU(s)
1106

POWER SUPPLY
1116

GPU(s)
1108

PRESENTATION
COMPONENT(S)
1118

COMM. INTERFACE
1110

LOGIC UNIT(S)
1120

I/O PORT(S)
1112

1102

1200

CAMERA CALIBRATION

BACKGROUND

Vehicles, such as autonomous or semi-autonomous vehicles, often incorporate sensors of varying sensor modalities in order to obtain sufficient information associated with environments surrounding the vehicles. For instance, the vehicles may use stereo camera systems to determine information associated with the environment, such as depth information to various points and/or objects. As such, in order for a stereo camera system to operate as intended, such as to determine accurate or precise depth information, the cameras included within the stereo camera system need to be calibrated with respect to one another. For example, relative pose parameters between the two cameras or image sensors—such as rotation and translation—as well as optical parameters—such as lens parameters—need to be accurate.

Conventional systems may use a stereo camera bracket to mount the cameras, such as at one or more locations on a vehicle. This design may ensure that the hardware level alignment between the two cameras remains constant. More specifically, the stereo camera bracket may cause the stereo camera system to include a rigid body that prevents the relative poses from changing while the vehicle moves. In addition, the conventional systems may use timestamps on the two cameras to synchronize the stereo camera system. As such, this type of camera synchronization may require additional software and/or hardware to implement. Additionally, in order to calibrate the cameras of the stereo camera system, the conventional systems use calibration targets, such as checkboards, circles, or other geometric patterns printed on plane board within a laboratory. As such, these conventional systems generally require targets to be available for the calibration and thus are not designed for real-time or near real-time calibration outside of a laboratory or testing environment.

SUMMARY

Embodiments of the present disclosure relate to sensor calibration for autonomous and semi-autonomous systems and applications. Systems and methods are disclosed that calibrate image sensors, such as cameras, using images captured using the image sensors at different time instances. For instance, a first image sensor may generate first image data representing at least two images and a second image sensor may generate second image data representing at least one image. One or more feature points may then be tracked between the images represented by the first image data and the image represented by the second image data. Additionally, the feature point(s), timestamps associated with the images and/or the feature point(s), poses associated with image sensors (e.g., poses of a vehicle), and/or other information may be used to determine one or more values of one or more parameters that calibrate the first image sensor with the second image sensor. In some examples, the value(s) of the parameter(s) is determined using one or more equations, such as an equation(s) associated with trifocal constraints. Additionally, in some examples, one or more techniques may be used to smooth the value(s) of the parameter(s) and/or verify the value(s) of the parameter(s).

In contrast to conventional systems, such as those described above, the current systems, in some embodiments, are able to perform real-time or near real-time image sensor calibration without using special calibration targets, without using fixture brackets for the image sensors, and/or without requiring the image sensors to be time synchronized. For instance, and as described herein, the systems, in some embodiments, are able to calibrate the image sensors based at least on using the tracked feature point(s) between the images captured by the image sensors, the timestamps associated with the feature point(s), and the poses of the image sensor(s), such as by using one or more trifocal constraints. Additionally, in contrast to the conventional systems, the current systems, in some embodiments, are able to verify, in real-time or near real-time, the value(s) of the parameter(s) without using specialized calibration targets.

BRIEF DESCRIPTION OF THE DRAWINGS

The present systems and methods for sensor calibration for autonomous or semi-autonomous systems and applications are described in detail below with reference to the attached drawing figures, wherein:

FIGS. 7-8 are flow diagrams showing methods for calibrating sensors, in accordance with some embodiments of the present disclosure;

FIG. 9 is a flow diagram showing a method for verifying one or more values for one or more parameters that calibrate sensors, in accordance with some embodiments of the present disclosure;

DETAILED DESCRIPTION

Figure 1:
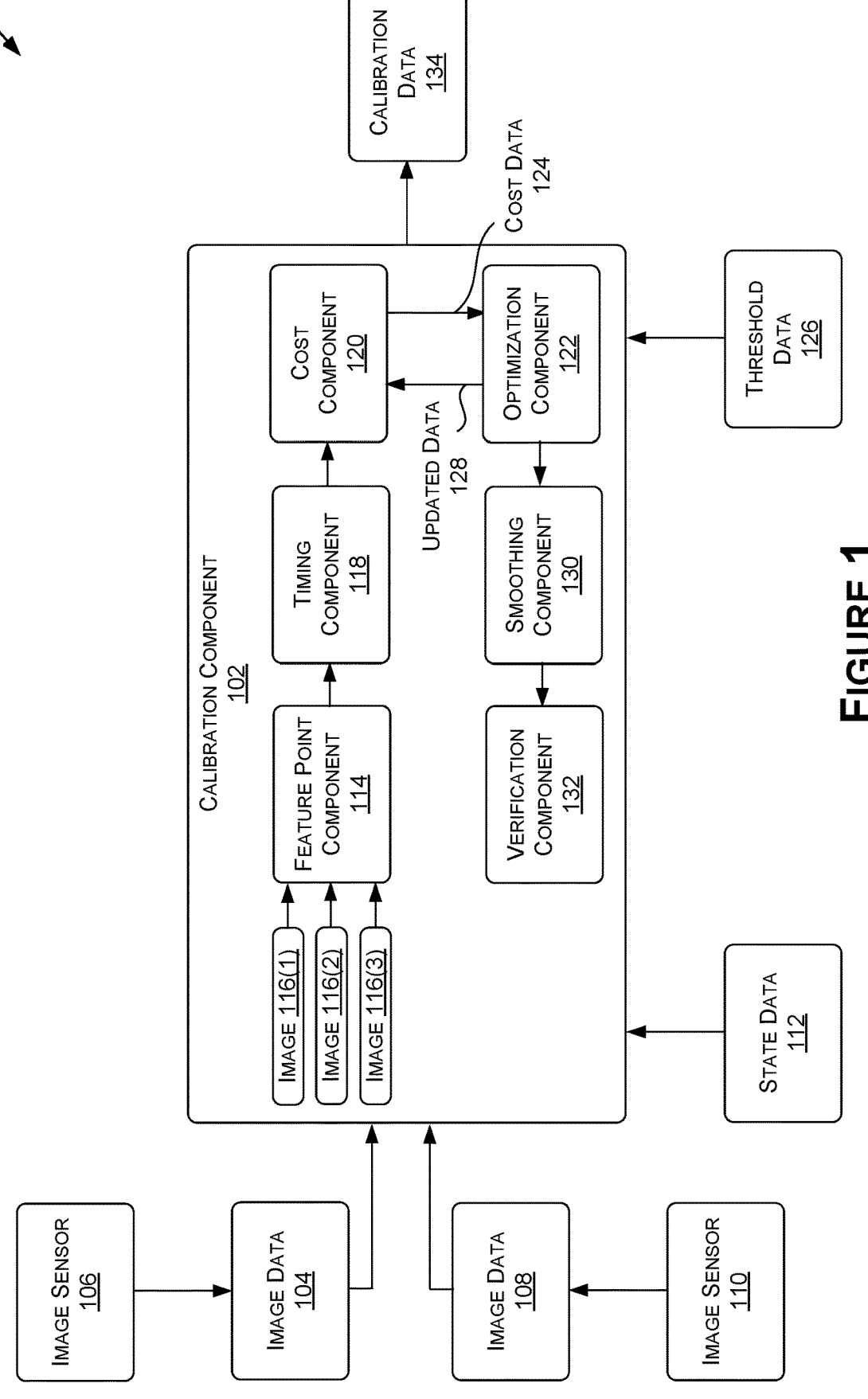
FIG. 1 illustrates an example data flow diagram for a process of performing sensor calibration, in accordance with some embodiments of the present disclosure.

Systems and methods are disclosed related to sensor calibration for autonomous and semi-autonomous systems and applications. Although the present disclosure may be described with respect to an example autonomous vehicle 1000 (alternatively referred to herein as "vehicle 1000" or "ego-vehicle 1000," an example of which is described with respect to FIGS. 10A-10D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to sensor calibration for autonomous or semi-autonomous machines, this is not intended to be limiting, and the systems and methods described herein may be used in augmented reality, virtual reality, mixed reality, robotics, security and surveillance, autonomous or semi-autonomous machine applications, and/or any other technology spaces where sensor calibration may be used.

For instance, a system(s) may receive image data generated using image sensors, such as cameras associated with (e.g., located or otherwise disposed on) a vehicle (and/or other type of machine). As described herein, the image data associated with an image sensor may represent one or more images depicting a field-of-view (FOV) associated with the image sensor. Additionally, the image data (and/or other data received from the image sensor) may represent timestamps indicating when the images were generated using the image sensor. For a first example, if the image sensor includes a global shutter, and for an image, the image data may represent a timestamp indicating a time that the image was generated using the image sensor. For a second example, if the image sensor includes a rolling shutter, and again for an image, the image data may represent a first timestamp indicating a first time that the image sensor began generating the image and a second timestamp indicating a second time that the image sensor finished generating the image.

In some examples, the system(s) may receive additional data from one or more other sensors of the vehicles. For instance, the system(s) may receive data representing locations of the vehicle, poses of the vehicle, and/or any other information associated with the vehicle when generating the image data. In some examples, this additional data may also represent timestamps, where the timestamps indicate the locations and/or the poses of the vehicle at various times while navigating an environment.

In some embodiments, the system(s) may then use at least two images represented by first image data generated using a first image sensor and one image represented by second image data generated using a second image sensor to determine one or more values of one or more parameters for calibrating the first image sensor with to the second image sensor. For instance, the system(s) may initially process the image data using one or more techniques in order to determine feature points within the images. As described herein, the technique(s) may include, but is not limited to, Harris Corner, Scale Invariant Feature Transform (SIFT), Speeded Up Robust Feature (SURF), Features from Accelerated Segment Test (FAST), Oriented FAST and Rotated BRIEF (ORB), and/or any other technique. The system(s) may then process the feature points in order to track a number of the feature points between the images. As described herein, the number of feature points may include, but is not limited to, one feature point, ten feature points, one hundred feature points, one thousand feature points, and/or any other number of feature points.

The system(s) may also use one or more techniques to determine timestamps associated with the tracked feature point(s). For a first example, and for a feature point associated with an image, if the image sensor that was used to generate the image includes a global shutter, then the system(s) may associate the timestamp for the image with the feature point. For a second example, and again for a feature point associated with an image, if the image sensor that was used to generate the image includes a rolling shutter, then the system(s) may use the first timestamp indicating the first time that the image sensor began generating the image, the second timestamp indicating the second time that the image sensor finished generating the image, and a row for which a pixel associated with the feature point is located to determine a third timestamp to associate with the feature point. In such an example, the system(s) may determine the third timestamp using interpolation.

The system(s) may then use one or more techniques to determine one or more costs associated with one or more initial values of the parameter(s) based at least on the tracked feature point(s), the poses associated with the vehicle when generating the images, the timestamps associated with the tracked feature point(s), and/or any other information. For instance, in some examples, to determine the cost(s), the system(s) may use one or more equations that incorporate projective geometric relationships between the views associated with the images, such as by relating the tracked feature point(s) in the three views (e.g., while being independent of the scene structure), while also depending on the relative motion (e.g., poses) among the three views and the value(s) of the parameter(s). For example, the system(s) may use one or more equations associated with trifocal constraints and/or trifocal tensors to determine the cost(s). In some examples, the system(s) may determine a respective cost associated with one or more (e.g., each) of the feature points that are tracked between the images.

The system(s) may then use the cost(s) to determine the value(s) of the parameter(s) for calibrating the image sensors. For example, the system(s) may use the cost(s) to determine a final cost associated with the initial value(s) of the parameter(s). If the system(s) determines that the final cost satisfies (e.g., is less than or equal to) a threshold cost, then the system(s) may determine to use the initial value(s) of the parameter(s) as the value(s) of the parameter(s) for calibrating the image sensors. However, if the system(s) determines that the cost does not satisfy (e.g., is greater than) the threshold cost, then the system(s) may update one or more of the value(s) of the parameter(s). Additionally, the system(s) may perform these processes again, using the updated value(s) of the parameter(s), until a determined final cost satisfies the threshold cost.

In some examples, the system(s) may perform one or more processes, such as one or more smoothing processes, to determine one or more final values of the parameter(s). For example, the system(s) may again perform the processes described above, but with using one or more different groups of three frames, to determine an additional value(s) of the parameter(s). In some examples, the system(s) may then filter out one or more of the determined values, such as a determined value that looks like an outlier as compared to the other determined values. Additionally, the system(s) may use the remaining values to determine the final value(s) of the parameter(s) for calibrating the image sensors. For example, and for a final value of a parameter, the system(s) may determine the final value based on an average of the values associated with the parameter, a mean of the values associated with the parameter, a mode of the values associated with the parameter, and/or using one or more additional and/or alternative techniques.

In some examples, the system(s) may one or more additional processes to verify the final value(s) of the parameter(s) for calibrating the image sensors. For example, the system(s) may determine, using one or more of the feature tracking techniques (such as but not limited to those described herein), that a first feature point from a first image represented by the first image data corresponds to a second feature point from a second image represented by the second image data. Additionally, the system may use one or more techniques, such as epipolar constraints, to determine that the first feature point projects to a line (e.g., an epipolar line) in the second image. The system(s) may then use one or more metrics, such as first statics of a horizontal translation associated with the feature point correspondence and/or statics of a vertical translation associated with the feature point correspondence, to determine whether the final value (s) of the parameter(s) is verified based on the second feature point and the line, which is described in more detail herein.

While the examples herein describe calibrating a first image sensor with respect to a second image sensor, in other examples, similar processes may be used to calibrate other types of sensors. In such examples, the sensors may include the same type of sensor modality and/or the sensors may include different types of sensor modalities. As described herein, a sensor modality may include, but is not limited to, an image sensor, a RADAR sensor, a LIDAR sensor, and/or any other type of sensor.

The systems and methods described herein may be used by, without limitation, non-autonomous vehicles, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems implementing one or more language models—such as one or more large language models (LLMs), systems for performing sensor calibration, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an example data flow diagram for a process 100 of performing sensor calibration, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1000 of FIGS. 10A-10D, example computing device 1100 of FIG. 11, and/or example data center 1200 of FIG. 12.

As shown, the process 100 may include a calibration component 102 receiving first image data 104 generated using a first image sensor 106 (e.g., a first camera) and second image data 108 generated using a second image sensor 110 (e.g., a second camera). In some examples, the first image sensor 106 and the second image sensor 110 are included as part of a stereo camera system, such as a stereo camera system of a vehicle or other machine. Additionally, the first image data 104 may represent first images depicting an environment from a first FOV of the first image sensor 106 while the second image data 108 represents second images depicting the environment from a second FOV of the second image sensor 110. In some examples, the first FOV of the first image sensor 106 at least partially overlaps with the second FOV of the second image sensor 110.

The first image data 104 and/or the second image data 108 may represent additional information associated with the images, such as timestamps associated with the images. For a first example, if the first image sensor 106 includes a global shutter, and for an image, the first image data 104 may represent a timestamp indicating a time that the image was generated using the first image sensor 106. For a second example, if the first image sensor 106 includes a rolling shutter, and again for an image, the first image data 104 may represent a first timestamp indicating a first time that the first image sensor 106 began generating the image and a second timestamp indicating a second time that the first image sensor 106 finished generating the image. Similar examples may apply to the second image sensor 110 and/or the second image data 108.

As further illustrated in the example of FIG. 1, in some examples, the process 100 may include the calibration component 102 receiving state data 112 associated with the vehicle. For instance, the state data 112 may represent at least poses associated with the vehicle when generating the first image data 104 and/or the second image data 108. As described herein, a pose may include, but is not limited to, a location of the vehicle (e.g., a x-coordinate location, a y-coordinate location, a z-coordinate location, etc.), an orientation of the vehicle (e.g., a roll, a pitch, a yaw, etc.), a velocity of the vehicle, and/or any other information associated with the vehicle. In some examples, the state data 112 may further represent timestamps associated with the poses. For example, the state data 112 may indicate that the vehicle included a first pose at a first time, a second pose at a second time, a third pose at a third time, and/or so forth.

Figure 2:
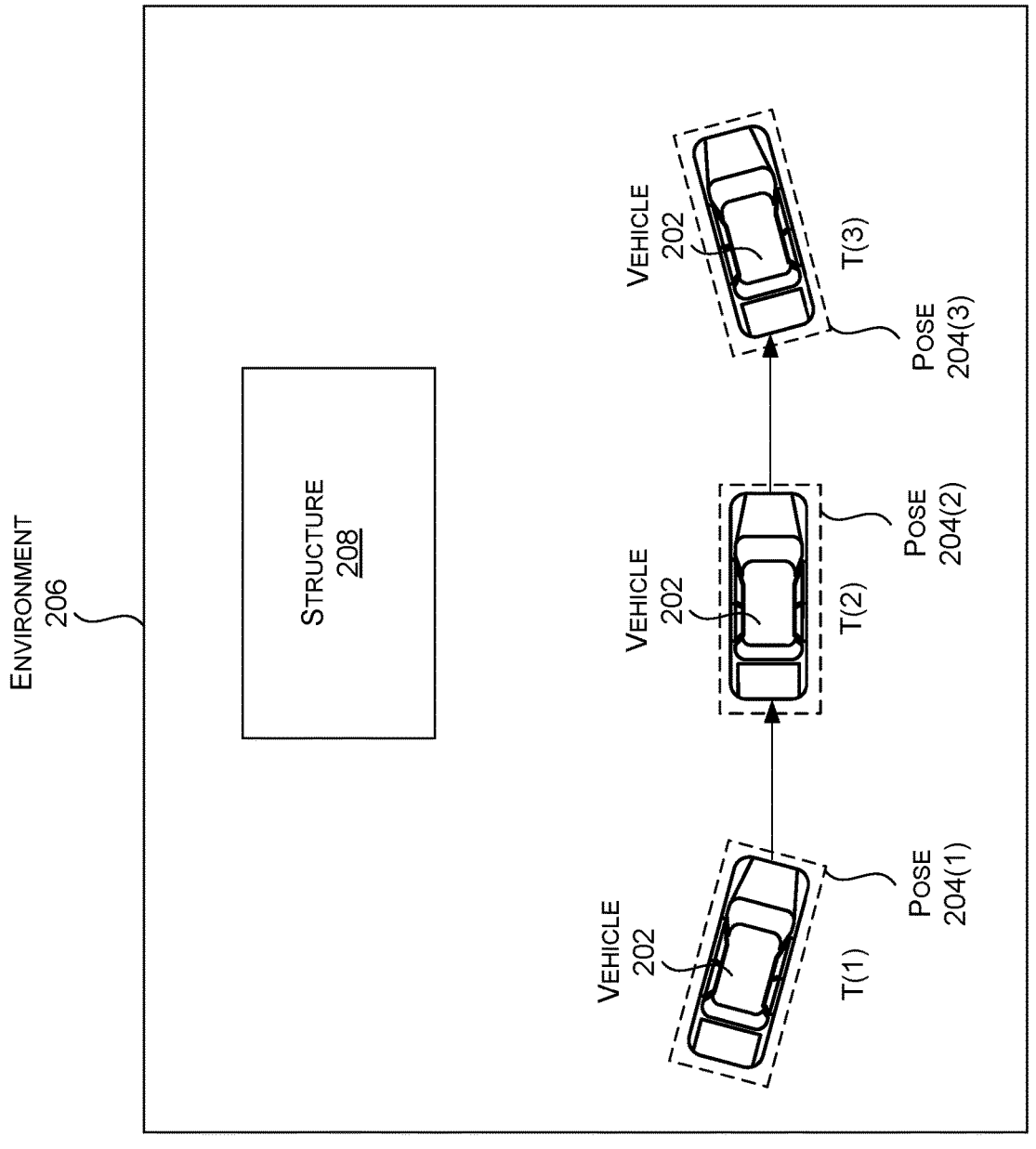
FIG. 2 illustrates an example of a vehicle including various poses while generating image data, in accordance with some embodiments of the present disclosure.

For instance, FIG. 2 illustrates an example of a vehicle 202 including various poses 204(1)-(3) (also referred to singularly as "pose 204" or in plural as "poses 204") while generating image data, in accordance with some embodiments of the present disclosure. In the example of FIG. 2, the vehicle 202 may be navigating around an environment 206 that includes at least a structure 208. Additionally, the vehicle 202 may include the first pose 204(1) (represented by the dashed rectangle) at a first time T(1) when capturing a first image using a first image sensor (e.g., the first image sensor 106), the second pose 204(2) (represented by the dashed rectangle) at a second time T(2) when capturing a second image using the first image sensor or a second image sensor (e.g., the second image sensor 110), and a third pose 204(3) (represented by the dashed rectangle) at a third time T(3) when capturing a third image using the second image sensor. In other words, the vehicle 202 may capture at least two images using an image sensor and at least one image using another image sensor.

Referring back to the example of FIG. 1, the process 100 may include the calibration component 102 using a feature point component 114 to process at least a first image 116(1) represented by the first image data 104, a second image 116(2) represented by the first image data 104, and a third image 116(3) represented by the second image data 108. For instance, the feature point component 114 may use one or more techniques in order to determine feature points within the images 116(1)-(3) (also referred to singularly as "image 116" or in plural as "images 116"). As described herein, the technique(s) may include, but is not limited to, Harris Corner, SIFT, SURF, FAST, ORB, and/or any other technique. As described herein, for an image 116, the feature point component 114 may determine any number of feature points. The number of feature points may include, but is not limited to, one feature point, ten feature points, one hundred feature points, one thousand feature points, ten thousand feature points, and/or any other number of feature points.

The feature point component 114 may then use one or more techniques to track a number of feature points between the images 116. As described herein, the technique(s) for tracking the feature points may include one or more software feature tracking techniques and/or one or more hardware feature tracking techniques. For instance, the feature point component 114 may use Kanade-Lucas-Tomasi (KLT), inverse compositional KLT, SURF, SIFT, optical flow estimation (which may use one or more optical flow accelerators (OFAs) of, for example, an SoC of the system), and/or any other type of feature tracking technique. Additionally, as described herein, the number of feature points tracked between the images 116 may include, but is not limited to, one feature point, ten feature points, one hundred feature points, one thousand feature points, ten thousand feature points, and/or any other number of feature points.

Figure 3A:
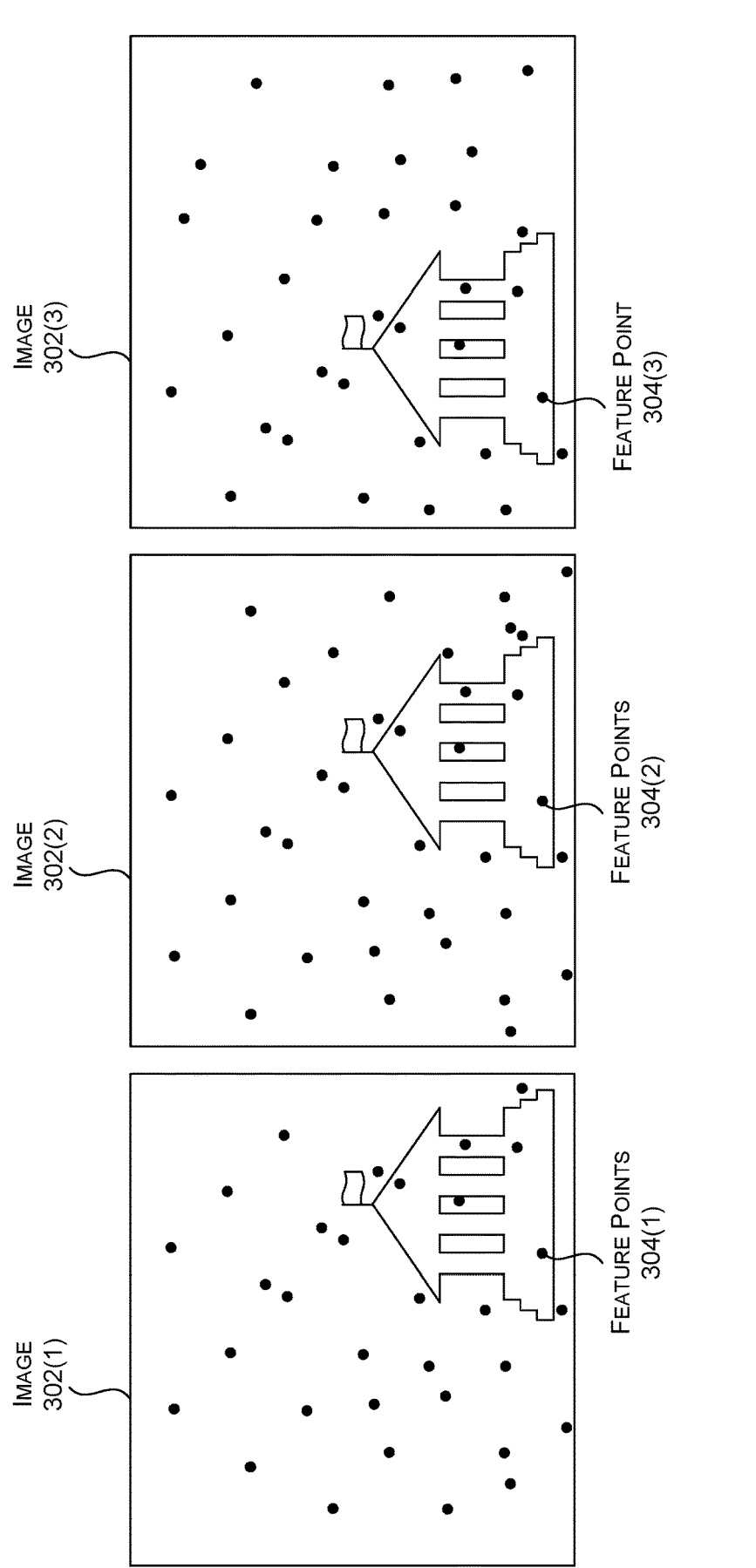
FIGS. 3A-3B illustrate an example of tracking feature points between images, in accordance with some embodiments of the present disclosure.
Figure 3B:
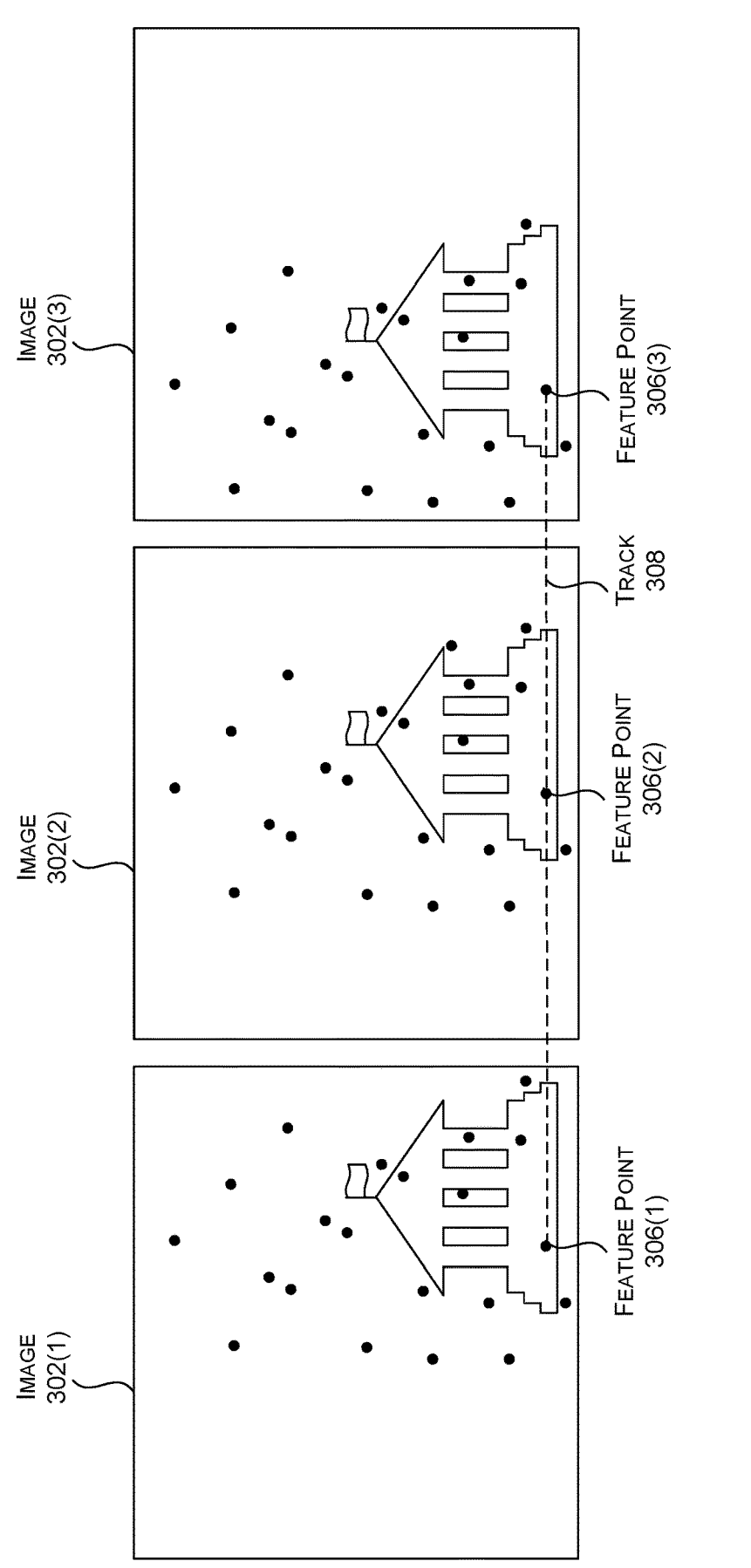

For instance, FIGS. 3A-3B illustrate an example of tracking feature points between images 302(1)-(3) (also referred to singularly as "image 302" or in plural as "images 302"), in accordance with some embodiments of the present disclosure. As shown by the example of FIG. 3A, the feature point component 114 may determine first feature points 304(1) (although only one is labeled for clarity reasons) associated with the first image 302(1) (which may represent, and/or include, the first image 116(1))), second feature points 304(2) (although only one is labeled for clarity reasons) associated with the second image 302(2) (which may represent, and/or include, the second image 116(2))), and third feature points 304(3) (although only one is labeled for clarity reasons) associated with the third image 302(3) (which may represent, and/or include, the third image 116 (3)). In some examples, the first image 302(1) may be associated with the first pose 204(1) and/or the first time T(1), the second image 302(2) may be associated with the second pose 204(2) and/or the second time T(2), and the third image 302(3) may be associated with the third pose 204(3) and/or the third time T(3). For example, the images 302 of FIG. 3A may depict the structure 208.

Next, and as shown by the example of FIG. 3B, the feature point component 114 may track at least a portion of feature points 304(1)-(3) between the images 302. For example, the feature point component 114 may determine that first feature points 306(1) from the first image 302(1) correspond to second feature points 306(2) from the second image 302(2) and third feature points 306(3) from the third image 302(3), where one feature point track 308 is indicated by the dashed line. While the example of FIG. 3B illustrates tracking twenty-one feature points between the images 302, in other examples, the feature point component 114 may track any other number of feature points between the images 302.

Referring back to the example of FIG. 1, the process 100 may include the calibration component 102 using a timing component 118 to determine timestamps associated with at least the tracked feature points. As described herein, in some examples, if the image sensors 106 and 110 include global shutters, then the timing component 118 may associate timestamps associated with the images 116 with the respective feature points corresponding to the images 116. For example, one or more first feature points of the first image 116(1) that are being tracked may be associated with a first timestamp indicating a first time that the first image 116(1) was generated, one or more second feature points of the second image 116(2) that are being tracked may be associated with a second timestamp indicating a second time that the second image 116(2) was generated, and one or more third feature points of the third image 116(3) that are being tracked may be associated with a third timestamp indicating a third time that the third image 116(3) was generated.

In some examples, if the image sensors 106 and 110 include rolling shutters, then the timing component 118 may using one or more additional processes to determine the timestamps associated with the tracked feature points. For example, and for a feature point being tracked from the first image 116(1), the timing component 118 may use a first timestamp indicating a first time that the first image sensor 106 began generating the first image 116(1), a second timestamp indicating a second time that the first image sensor 106 finished generating the first image 116(1), and a row associated with the feature point (e.g., a row that the pixel associated with the feature point is located) to determine a third timestamp indicating a third time associated with the feature point. For example, the timing component 118 may interpolate between the first time and the second time based at least on the row.

Figure 4:
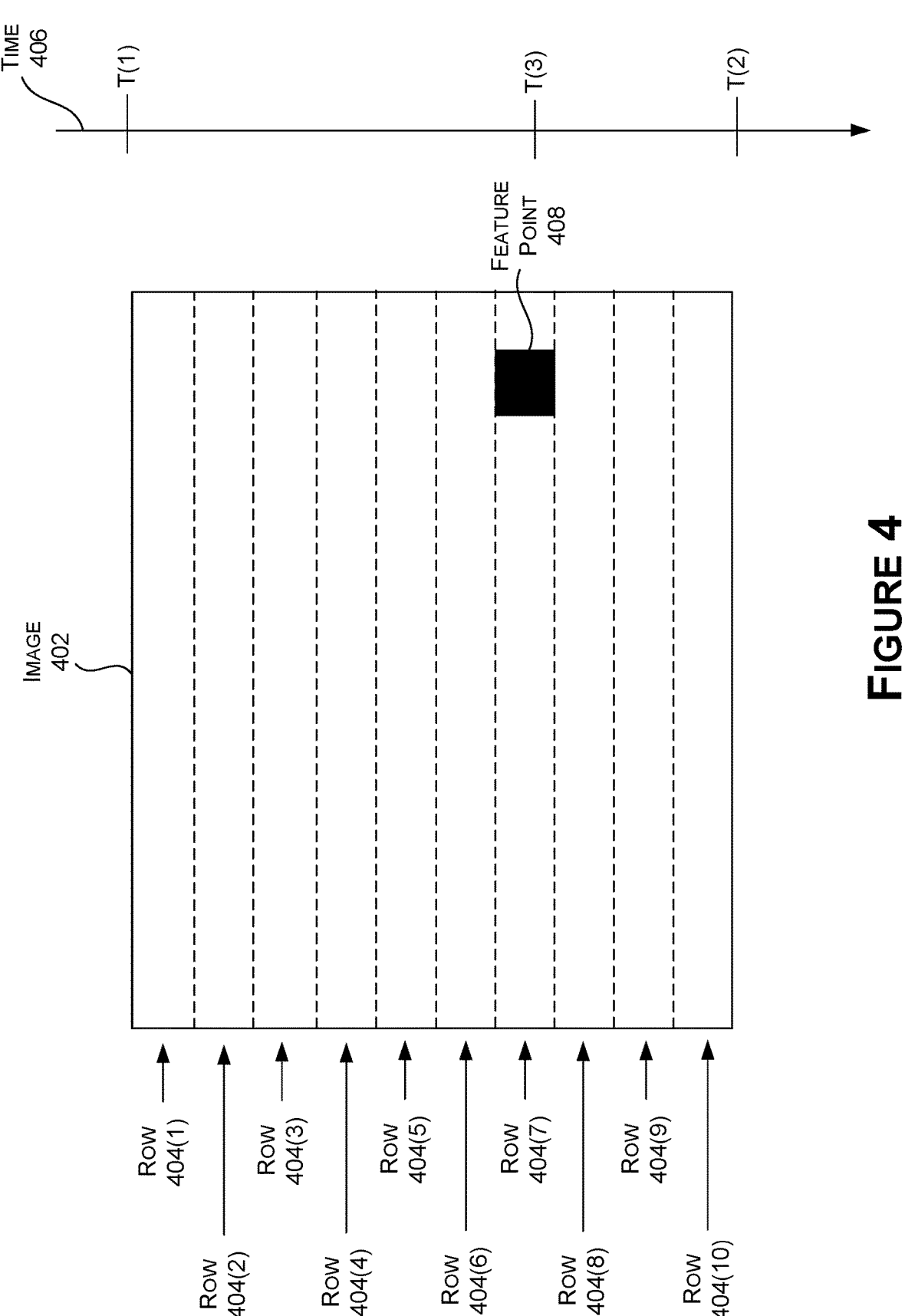
FIG. 4 illustrates an example of determining a timestamp associated with a tracked feature point, in accordance with some embodiments of the present disclosure.

For instance, FIG. 4 illustrates an example of determining a timestamp associated with a tracked feature point, in accordance with some embodiments of the present disclosure. As shown by the example of FIG. 4, the timing component 118 may be processing an image 402 (which may represent, and/or include, one of the images 302) that includes rows 404(1)-(10) (also referred to singularly as "row 404" or in plural as "rows 404") of pixels. While the example of FIG. 4 illustrates the image 402 as including ten rows 404 of pixels, in other examples, the image 402 may include any other number of rows 404 of pixels. The example of FIG. 4 also illustrates a timing 406, where the timing 406 indicates a first time T(1) that an image sensor started generating the image 402 and a second time T(2) that the image sensor finished generating the image 402. As such, the timing component 118 may use the first time T(1), the second time T(2), and the row 404(7) associated with a feature point 408 to determine a third time T(3) that the image sensor generated the pixel associated with the feature point 408.

For instance, the timing component 118 may use interpolation to determine the third time T(3) based at least on the first time T(1), the second time T(2), and the row 404(7). For example, if the first time T(1) includes time 1 second and the second time T(2) includes time 2 seconds, then the timing component 118 may determine that the third time T(3) includes time 1.7 seconds since the feature point 408 is associated with the seventh row 404(7) from the total of ten rows 404. The timing component 118 may then use similar processes to determine timestamps associated with additional feature points located in one or more additional rows 404.

Referring back to the example of FIG. 1, the process 100 may include the calibration component 102 using a cost component 120 to determine one or more costs associated with one or more initial values of one or more parameters for calibrating the first image sensor 106 with the second image sensor 110. As described herein, the parameter(s) may include one or more intrinsic parameters and/or one or more extrinsic parameters associated with the first image sensor 106 and/or the second image sensor 110. For instance, the parameter(s) may include one or more translation dimensions and/or one or more rotation dimensions. For example, the one or more translation dimensions may include, but are not limited to, a translation in the x-direction, a translation in the y-direction, and/or a translation in the z-direction. The one or more rotation dimensions may include, but are not limited to, a roll rotation, a yaw rotation, and/or a pitch rotation. Additionally, in some examples, the parameter(s) may include one or more lens parameters associated with the first image sensor 106 and/or one or more lens parameters associated with the second image sensor 110. The parameter(s) may include a focal length, optical center, skew, principal point, scale factor, etc.

In some examples, the cost component 120 may determine the initial value(s) of the parameter(s) using one or more techniques. For example, the cost component 120 may determine the initial value(s) of the parameter(s) using one or more design documents associated with the stereo camera system and/or the vehicle, using one or more previous values of the parameter(s) determined during a previous calibration session, using one or more values of the parameter(s) associated with a similar stereo camera system and/or vehicle, and/or using any other technique.

The cost component 120 may then use one or more techniques to determine the cost(s) associated with the initial value(s) of the parameter(s) using at least the initial value(s) of the parameter(s), the tracked feature point(s), the poses associated with the vehicle when generating the images 116, the timestamps associated with the tracked feature point(s), and/or any other information. In some examples, one or more equations used by the cost component 120 to determine the cost(s) may incorporate projective geometric relationships between the views associated with the images 116, such as by relating the feature point(s) in the three views, (e.g., while being independent of the scene structure) while also depending on the relative motion (e.g., poses) among the three views and the initial value(s) of the parameter(s). For example, the cost component 120 may use one or more equations associated with trifocal constraints and/or trifocal tensors to determine the cost(s). In some examples, the cost component 120 may determine a respective cost associated with one or more (e.g., each) of the feature points that are tracked between the images 116.

Figure 5A:
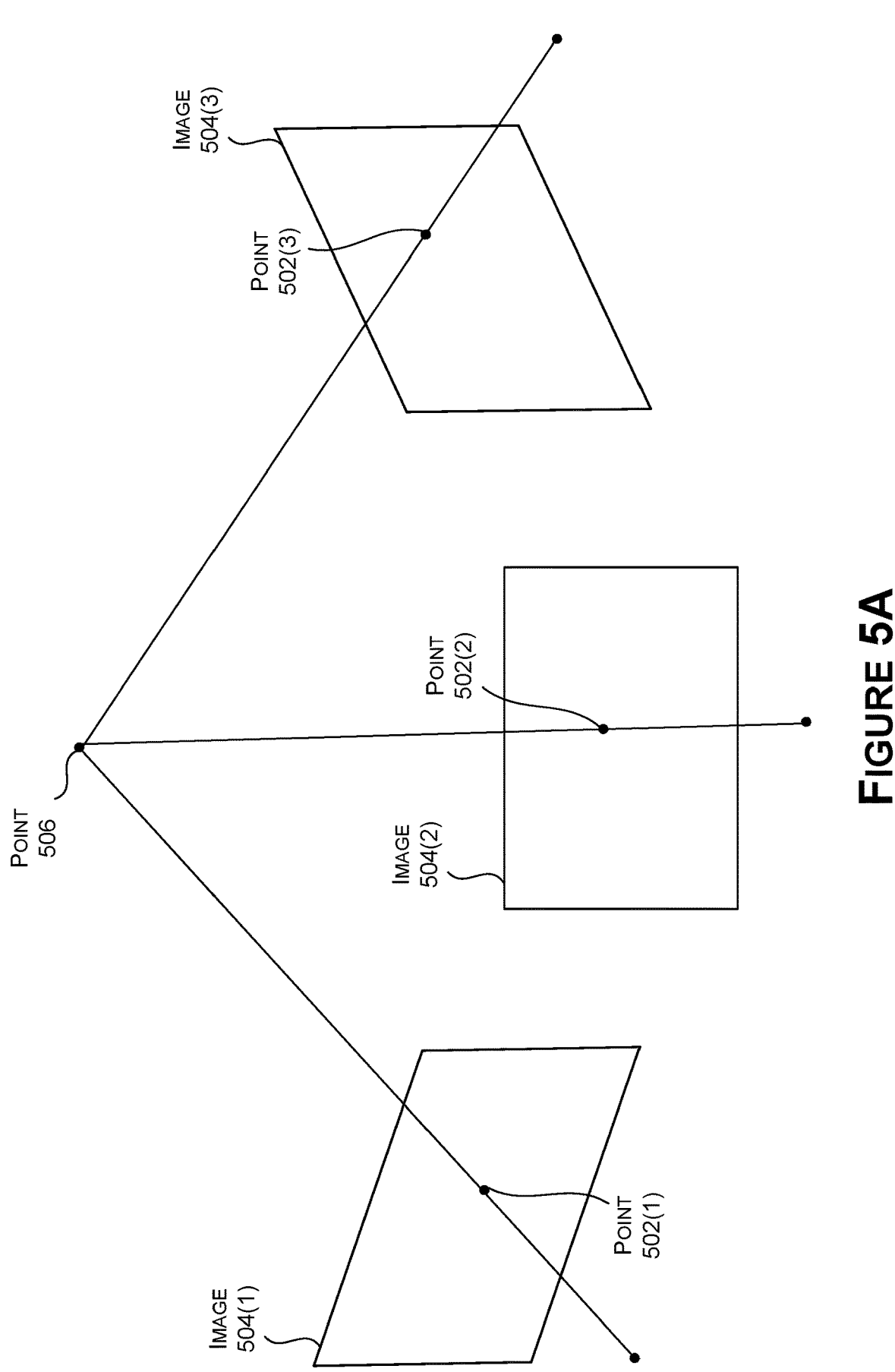
FIGS. 5A-5B illustrate examples of trifocal constraints that may be used to determine costs, in accordance with some embodiments of the present disclosure.
Figure 5B:
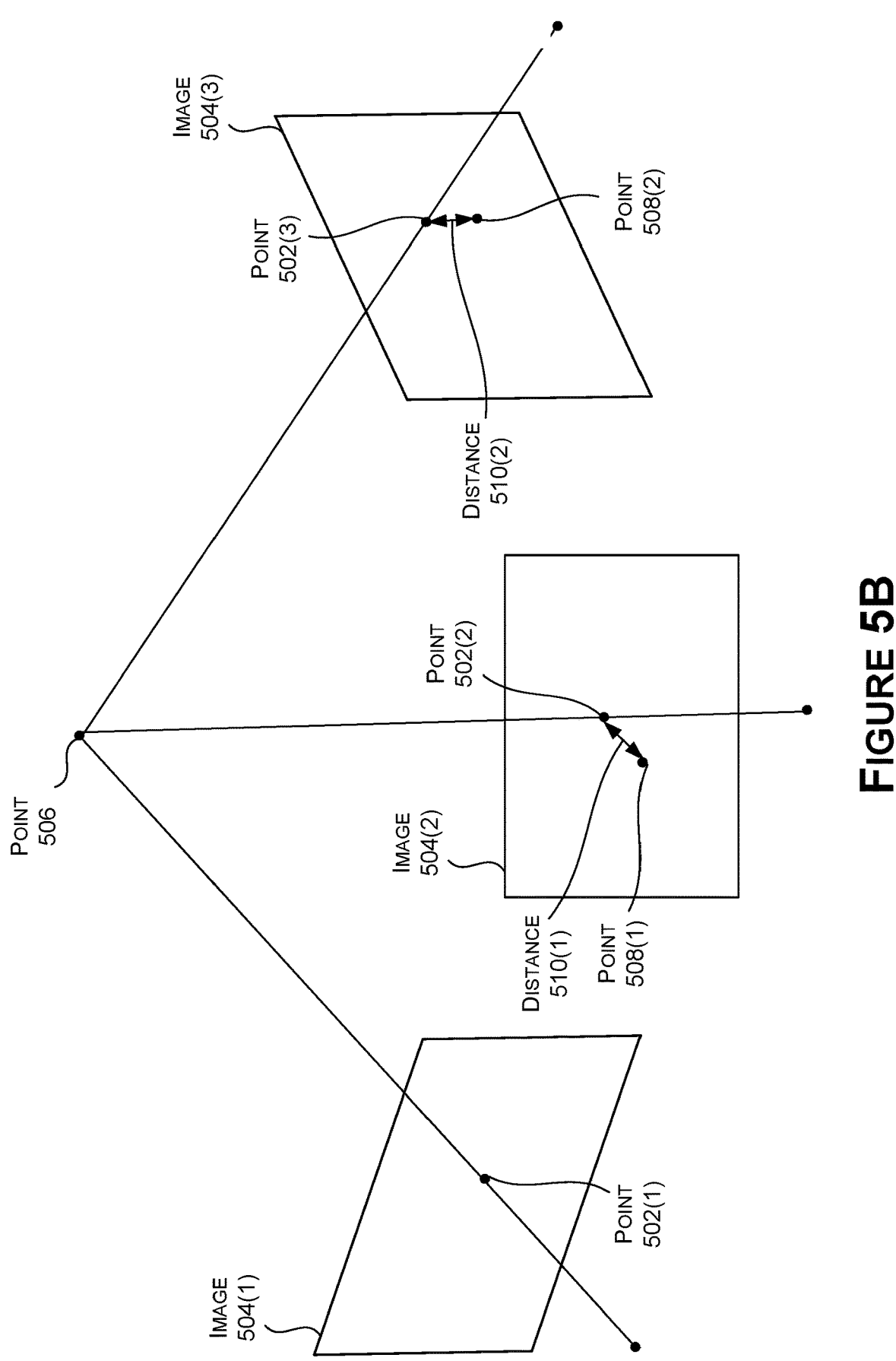

As an illustration of a trifocal constraints, FIGS. 5A-5B illustrate examples of trifocal constraints that may be used to determine costs, in accordance with some embodiments of the present disclosure. As shown by the example of FIG. 5A, a feature point 502(1)-(3) (which may also be referred to singularly as "feature point 502") (which may represent, and/or include, one of the feature points 306) may be tracked between three images 504(1)-(3) (which may also be referred to singularly as "image 504" or in plural as "images 504") (which may respectively represent, and/or include, the images 302(1)-(3)). For instance, a point 506 in space may be projected to the feature points 502 within the images 504. The trifocal constraints thus link (e.g., via a trilinear form) the first point 502(1) of the first image 504(1) to the second point 502(2) of the second image 504(2) and the third point 502(3) of the third image 504(3).

As such, a cost associated with the feature point 502 may be based on a distance between a tracked feature point in the second image 504(2) the projected point 502(2) and/or a distance between a tracked feature point in the third image 504(3) and the projected point 502(3). For instance, in some examples, the greater the distance between tracked feature point and the projected point 502(2) and/or the greater the distance between tracked feature point and the projected point 502(3), the greater the cost. Additionally, the lesser the distance between the tracked feature point and the projected point 502(2) and/or the lesser the distance between the tracked feature point and the projected point 502(3), the lesser the cost.

For instance, and as shown by the example of FIG. 5B, the feature point 502(1) may be tracked to a feature point 508(1) in the second image 504(2) and a feature point 508(2) in the third image 504(3). As such, a cost may be determined based at least on a distance 510(1) between the projected point 502(2) and the feature point 508(1) and/or a distance 510(2) between the projected point 502(3) and the feature point 508(2).

Referring back to the example of FIG. 1, and as described herein, the cost component 120 may determine a respective cost associated with one or more (e.g., each) of the tracked feature point(s) between the images 116. As such, the cost component 120 may then use the cost(s) of the feature point(s) to determine a final cost associated with the initial value(s) of the parameter(s). In some examples, the cost component 120 determines the final cost by adding each of the cost(s) together. However, in other examples, the cost component 120 may use one or more additional and/or alternative techniques to determine the final cost, such as by taking the average of the cost(s), the mean of the cost(s), the mode of the cost(s), and/or using any other technique.

The process 100 may then include the calibration component 102 using an optimization component 122 to determine, based at least on the final cost which may be represented by cost data 124, whether the initial value(s) of the parameter(s) includes the optimized value(s) of the parameter(s). In some examples, the optimization component 122 may determine that the initial value(s) of the parameter(s) includes the optimized value(s) of the parameter(s) based at least on the final cost satisfying (e.g., being less than or equal to) a threshold cost, where the threshold cost is represented by threshold data 126. Additionally, the optimization component 122 may determine that the initial value(s) of the parameter(s) does not include the optimized value(s) of the parameter(s) based at least on the final cost not satisfying (e.g., being greater than) the threshold cost. In some examples, based at least on determining that the initial value(s) of the parameter(s) does not include the optimized value(s) of the parameter(s), the optimization component 122 may then update one or more of the initial value(s) of the parameter(s). The optimization component 122 may then send, to the cost component 120, updated data 128 representing the updated value(s) of the parameter(s).

The cost component 120 may then use one or more of the processes described herein to determine a final cost associated with the updated value(s) of the parameter(s). Additionally, the optimization component 122 may use one or more of the processes described herein to determine whether the updated value(s) of the parameter(s) includes the optimized value(s) of the parameter(s) based at least on the final cost. The cost component 120 and the optimization component 122 may then continue to perform these processes until determining the optimized value(s) of the parameter(s) that include a cost that satisfies the threshold cost.

For a first example of determining a cost and/or an optimized value(s) of the parameter(s), the cost component 120 may let $P_1$ and $P_2$ be the projection matrices of the three-view setting, where $P_1=[A, a]$ and $P_2=[B, b]$. The trifocal tensor is then a 3×3×3 tensor $$T = \{T_i\} = \{A_i * b^T - a * B_i^T\}$$

for i=1,2,3, and $A_i$ and $B_i$ are the $i^{th}$ column of A and B, respectively. As such, the trifocal constraint is defined as: $rB_x*sum_i(rA_x*T_i)*rC_x=0$. Here, $rA_i$ is the $i^{th}$ element of the ray rA and $rB_x/rC_x$ is the cross-product matrix of ray rB/rC. Additionally, rA, rB, and rC are the rays corresponding to the feature matches in the images 116. The cost component 120 may then linearize a 3×3 matrix $rB_x*sum(rA_x*T_1)*rC_x$ as the final 9×1 residuals that are minimized. This may be used by the cost component 120 to determine one or more costs for the tracked feature point(s) (e.g., a respective cost for each tracked feature point) and/or the optimization component 122 to determine the optimized value(s) of the parameter(s).

For a second example, a tensor may be a collection of three rank-two 3×3 matrices $T_1$, $T_2$, $T_3$ known as its correlation slices. Assuming that projection matrices of the three views of the images 116 are P=[I|0], P'=[A|a_4], and P''= [B|B_4], the correlation slices of the corresponding tensor may be expressed in closed form as $$T_i = a_i b_4' - a_4 b_i',$$

where i=1 . . . 3, and $a_i$ and $b_i$ are respectively the it columns of the camera matrices.

In the second example, it may be important that the trifocal tensor gives rise to linear relationships between lines and points in the images 116. Specifically, for triplets of corresponding points $x \leftrightarrow x' \leftrightarrow x''$ and any corresponding lines $l \leftrightarrow l' \leftrightarrow l''$ through them, the following trilinear constraints may hold:

$$(l''[T_1, T_2, T_3]l')[l]_x = 0^t \tag{1}$$

$$l'' \left( \sum_i x_i T_i \right) l'' = 0 \tag{2}$$

$$l'' \left( \sum_i x_i T_i \right) [x'']_x = 0^t \tag{3}$$

$$[x']_x \left( \sum_i x_i T_i \right) l'' = 0 \tag{4}$$

$$[x']_x \left( \sum_i x_i T_i \right) [x'']_x = 0_{3 \times 3} \tag{5}$$

In equations (1)-(5), $[\bullet]_x$ may denote the skew-symmetric cross product matrix. Again, this may be used by the cost component 120 to determine one or more costs for the tracked feature point(s) (e.g., a respective cost for each tracked feature point) and/or the optimization component 122 to determine the optimized value(s) of the parameter(s).

Still, for a third example, and using the example of FIG. 2, let {A, B, C} respectively denote the three timestamps T(1), T(2), and T(3). As such, using the current stereo trifocal calibration routine, let leftA denote the left image (e.g., the first image 302(1)) taken at timestamp A, leftB denote the left image (e.g., the second image 302(2)) taken at timestamp B, and rightC denote the right image (e.g., the third image 302(3)) taken at timestamp C. As such, using feature matching, one example pair of matching is {xA, xB} and {xA, xC}. The matching of {xA, xB} constrains the pose leftA2leftB and the matching of {xA, xC} constrains the pose leftA2rightC of the vehicle 202.

As such, the cost component 120 may decompose leftA2leftB and leftA2rightC using the following:

$$leftA2leftB = rigB2leftB * rigA2rigB * leftA2rigA \tag{6}$$

$$leftA2rightC - rigC2rightC * rigA2rigC * rightA2rigA * leftA2rightA \tag{7}$$

In equations (6)-(7), rig is the coordinate frame system of the vehicle 202 at the various timestamps. Also, since rig2left may be independent of time, rigA2leftA=rigB2leftB=rigC2leftC. The same may apply to rig2right and left2right. As such, the equations may be rewritten as the following:

$$leftA2leftB = rig2left * rigA2rigB * left2rig \tag{8}$$

$$leftA2rightC - rig2right * rigA2rigC * left2right \tag{9}$$

In some instances, the optimization variable is {leftA2leftB, leftA2rightC}, where leftA2leftC is the main variable since it directly relates the ultimate variable left2right and leftA2leftB is an auxiliary variable, where optimizing leftA2leftB helps correct errors in rigA2rigB and left2rig and also helps constrain the solution leftA2rightC.

As described herein, the cost component 120 may use an initial guess for {leftA2leftB, leftA2rightC}. The cost component 120 and/or the optimization component 122 may then get a solution for leftAleftB by using the motion of the vehicle 202 to get rigA2rigB, getting the initial rig2left, and using equation (8) to calculate. Additionally, the cost component 120 and/or the optimization component 122 may get the solution for leftA2rightC by using the motion of the vehicle 202 to get rigA2rigC, getting the initial rig2right, getting left2right from the previous iteration, and then using equation (9) to calculate. After optimization, the cost component 120 and/or the optimization component 122 may get the optimized pose {leftA2leftB*, leftA2rightC*} by the following:

$$Left2right^* = (rig2right * riga2rigC * right2rig)inv() * leftA2rightC^* \quad (10)$$

When using equation 10, the cost component 120 and/or the optimization component 122 may use additional equations when the image sensors 106 and 110 include rolling shutters. For example, when considering the rolling shutter effects, the cost component 120 and/or the optimization component 122 may estimate the pose between leftAk2leftBk, where the kth feature pair is on different rows of leftA and leftB. As such, the equations may be rewritten as the following:

$$leftAk2leftBk = leftBn2Bk * leftAn2leftBn * leftAk2An \quad (11)$$

$$leftAk2rightCk = rightCn2Ck * leftAn2rightCn * leftAk2An \quad (12)$$

In equations (11)-(12), leftAk2An, leftBk2An, and rightCk2An are the poses 208(1)-(3) between row k to row n of the images.

In some examples, the feature point component 114, the timing component 118, the cost component 120, and/or the optimization component 122 may continue to perform these processes using one or most additional iterations, where a respective iteration uses a new group of three images 116 to determine a respective optimized value(s) of the parameter(s) for calibrating the first image sensor 106 with respect to the second image sensor 110. For example, the feature point component 114, the timing component 118, the cost component 120, and/or the optimization component 122 may continue to perform these processes to determine five optimized values of the parameter(s), ten optimized values of the parameter(s), fifty optimized values of the parameter(s), one hundred optimized values of the parameter(s), one thousand optimized values of the parameter(s), and/or so any other number of optimized values of the parameter(s).

The process 100 may then include the calibration component 102 using a smoothing component 130 to determine one or more final value(s) of the parameter(s) using the optimized value(s) of the parameter(s) during the one or more iterations. In some examples, the smoothing component 130 uses one or more filtering and/or smoothing techniques to determine the final value(s) of the parameter(s). For a first example, the smoothing component 130 may use a Kalman filter to filter the optimized value(s) of the parameter(s) and/or smooth the optimized value(s) of the parameter(s). For a second example, the smoothing component 130 may use a different type of filtering technique, such as an exponential smoother, a Kernel smoother, a moving average smoother, a Kolmogorov-Zurbenko filter, and/or any other type of filter. Still, for a third example, the smoothing component 130 may determine the final value(s) of the parameter(s) as the average of the optimized value(s) of the parameter(s), the mean of the optimized value(s) of the parameter(s), the mode of the optimized value(s) of the parameter(s), and/or using one or more additional and/or alternative techniques.

The process 100 may include the calibration component 102 using a verification component 132 to verify the final value(s) of the parameter(s) for calibrating the first image sensor 106 with the second image sensor 110. For instance, the verification component 132 may use at least a first image 116 generated using the first image sensor 106, a second image 116 generated using the second image sensor 110, and data representing one or more tracked feature points between the images 116 to verify the final value(s) of the parameter(s). In some examples, the verification component 132 uses statistics associated with a horizontal translation of feature point correspondences to verify the final value(s) of the parameter(s). In some examples, the verification component 132 uses statistics associated with a vertical translation of feature point correspondences to verify the final value(s) of the parameter(s).

For an example, the verification component 132 may use the final value(s) of the parameter(s) and a feature point from the first image 116 generated using the first image sensor 106 to determine an epipolar line associated with the second image 116 generated using the second image sensor 110. The verification component 132 may then determine whether the corresponding, tracked feature point from the second image 116 is located on the epipolar line and/or within a threshold distance to the epipolar line. Based at least on determining that the corresponding feature point is located on the epipolar line and/or within the threshold distance to the epipolar line, the verification component 132 may verify the final value(s) of the parameter(s). However, based at least on determining that the corresponding feature point is not located on the epipolar line and/or is outside of the threshold distance to the epipolar line, the verification component 132 may not verify the final value(s) of the parameter(s).

In some examples, the verification component 132 uses a number of tracked feature points (e.g., ten tracked feature points, one hundred tracked feature points, one thousand tracked feature points, etc.) between the images 116 to verify the final value(s) of the parameter(s). In such examples, the verification component 132 may verify the final value(s) of the parameter(s) based at least on a threshold number and/or a threshold percentage of the tracked feature points being located on a respective epipolar line and/or within the threshold distance to the respective epipolar line. As described herein, a threshold number of feature points may include, but is not limited to, one feature point, ten feature points, one hundred feature points, one thousand feature points, and/or any other number of feature points. Additionally, a threshold percentage of feature points may include, but is not limited to, 90%, 95%, 99%, 99.9%, and/or any other percentage of feature points.

Figure 6:
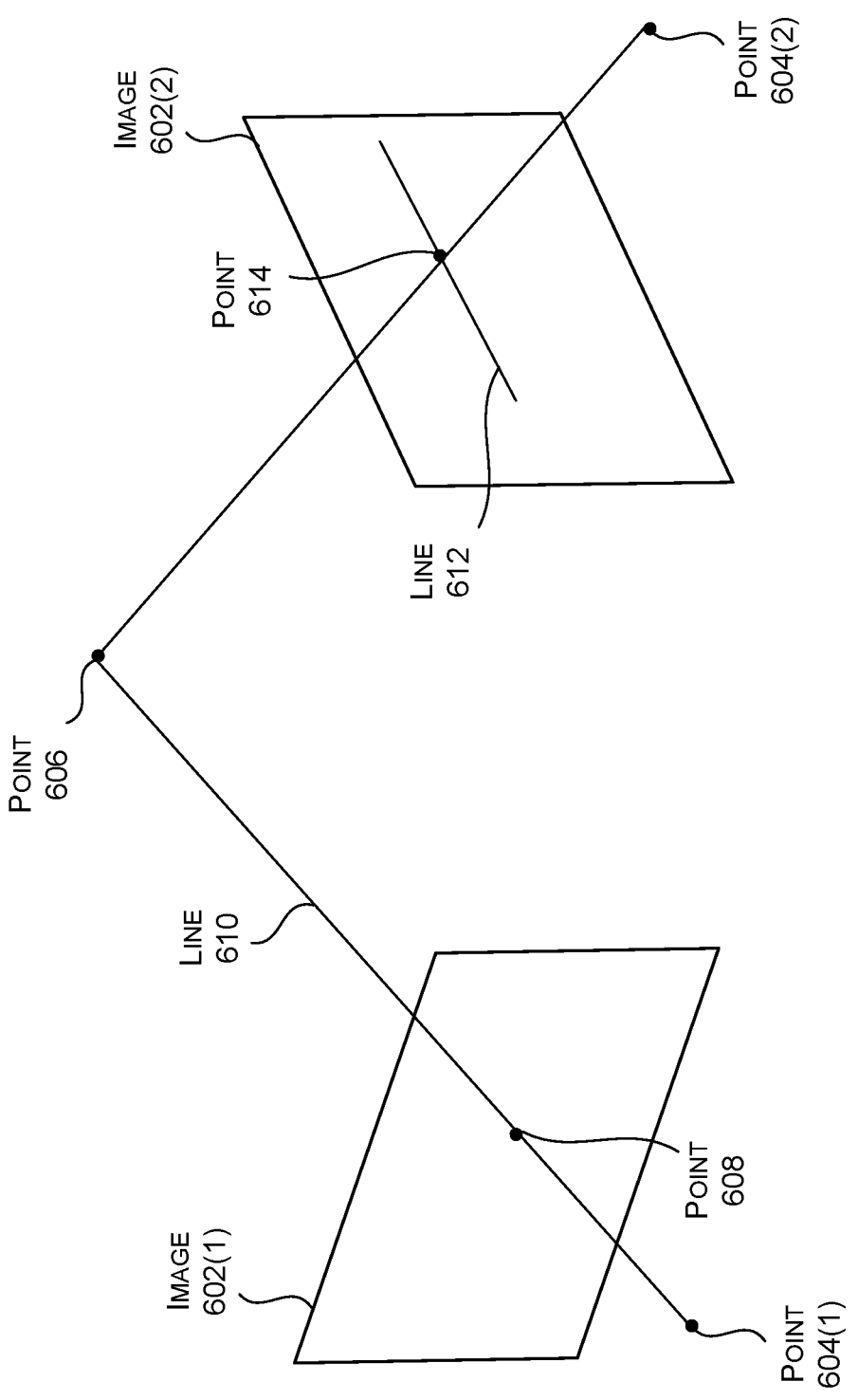
FIG. 6 illustrates an example of verifying one or more values of one or more parameters for calibrating image sensors, in accordance with some embodiments of the present disclosure.

For instance, FIG. 6 illustrates an example of verifying one or more final values of one or more parameters for calibrating image sensors, in accordance with some embodiments of the present disclosure. In the example of FIG. 6, a first image 602(1) may be generated using a first image sensor (e.g., the first image sensor 106) and a second image 602(2) may be generated using a second image sensor (e.g., the second image sensor 110). A first point 604(1) may represent a center of symmetry of a first lens of the first image sensor and a second point 604(2) may represent a center of symmetry of a second lens of the second image sensor. Additionally, a point 606 may represent a point of interest associated with the images 602(1)-(2), where the point 606 projects to a feature point 608 associated with the first image 602(1).

In the example of FIG. 6, a line 610 is seen as a point within the first image 602(1) since the line 610 is created using the point 604(1) and the point 606. However, the line 610 may be seen in the second image 602(2) as a line 612 (e.g., an epipolar line). Additionally, and as described herein, a feature point 614 that corresponds to the feature point 608 should be located along the line 612 based at least on the final value(s) of the parameter(s) calibrating the image sensors correctly. For example, and in the example of FIG. 6, the verification component 132 may verify the final value(s) of the parameter(s) based at least on the corresponding feature point 614 being located on (and/or within a threshold distance) to the line 612. Additionally, in some examples, the verification component 132 may use similar processes to verify the final value(s) of the parameter(s) using one or more additional feature points associated with the images 602(1)-(2).

Referring back to the example of FIG. 1, the process 100 may include the calibration component 102 generating and/or outputting calibration data 134 representing the final value(s) of the parameter(s). For example, the calibration data 134 may represent one or more values associated with the one or more translation dimensions, one or more values associated with the one or more rotation dimensions, one or more values associated with the one or more lens parameters of the first image sensor 106, and/or one or more values of the one or more lens parameters of the second image sensor 110. In some examples, the process 100 may repeat, such as given time intervals (e.g., every day, week, month, year, etc.), when events occur (e.g., while the vehicle is navigating, based on user input, etc.), and/or the like.

While the example of FIG. 1 illustrates calibrating the first image sensor 106 with respect to the second image sensor 110, in other examples, similar processes may be used to calibrate different types of sensors. For instance, in other examples, the first image sensor 106 and/or the second image sensor 110 may alternatively include a RADAR sensor, a LIDAR sensor, and/or any other type of sensor.

Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods 700, 800, and 900 may also be embodied as computer-usable instructions stored on computer storage media. The methods 700, 800, and 900 may be provided by a standalone application, a service or hosted service (standalone or in combination with another hosted service), or a plug-in to another product, to name a few. In addition, the methods 700, 800, and 900 are described, by way of example, with respect to FIG. 1. However, these methods 700, 800, and 900 may additionally or alternatively be executed by any one system, or any combination of systems, including, but not limited to, those described herein.

FIG. 7 is a flow diagram showing a first method 700 for calibrating sensors, in accordance with some embodiments of the present disclosure. The method 700, at block B702, may include determining, based at least on first image data generated using a first image sensor of a machine, that a first feature point of a first image represented using the first image data corresponds to a second feature point of a second image represented by the first image data. For instance, the calibration component 102 may receive the first image data 104 generated using the first image sensor 106, where the first image data 104 represents at least the first image 116(1) and the second image 116(2). The calibration component 102 (e.g., the feature point component 114) may then process the first image 116(1) and the second image 116(2), using one or more techniques associated with feature point tracking, in order to determine that the first feature point from the first image 116(1) corresponds to the second feature point from the second image 116(2).

The method 700, at block B704, may include determining, based at least on the first image data and second image data generated using a second image sensor of the machine, that the second feature point corresponds to a third feature point of a third image represented by the second image data. For instance, the calibration component 102 may receive the second image data 108 generated using the second image sensor 110, where the second image data 108 represents at least the third image 116(3). The calibration component 102 (e.g., the feature point component 114) may then process the second image 116(2) and the third image 116(3), using one or more techniques associated with feature point tracking, in order to determine that the second feature point from the second image 116(2) corresponds to the third feature point from the third image 116(3).

The method 700, at block B706, may include determining, based at least on the first feature point of the first image, the second feature point of the second image, and the third feature point of the third image, one or more values of one or more parameters for calibrating the first image sensor with the second image sensor. For instance, the calibration component 102 (e.g., the cost component 120, the optimization component 122, and/or the smoothing component 130) may perform the processes described herein to determine the value(s) of the parameter(s) represented by the calibration data 134 using the tracked feature point. As described herein, in some examples, the calibration component 102 may determine the value(s) of the parameter(s) using trifocal constraints. Additionally, in some examples, the calibration component 102 (e.g., the verification component 132) may perform one or more processes for verifying the value(s) of the parameter(s).

FIG. 8 is a flow diagram showing a second method 800 for calibrating sensors, in accordance with some embodiments of the present disclosure. The method 800, at block B802, may include receiving first image data generated using a first image sensor and second image data generated using a second image sensor, the first image data representing a first image and a second image and the second image data representing a third image. For instance, the calibration component 102 may receive the first image data 104 generated using the first image sensor 106 and the second image data 108 generated using the second image sensor 110. As described herein, the first image data 104 may represent the first image 116(1) and the second image 116(2) and the second image data 108 may represent the third image 116(3).

The method 800, at block B804, may include determining, based at least on the first image data and the second image data, a cost associated with one or more values of one or more parameters for calibrating the first image sensor with the second image sensor. For instance, the calibration component 102 (e.g., the feature point component 114) may track one or more feature points between the images 116. The calibration component 102 (e.g., the cost component 120) may then use one or more techniques (e.g., trifocal constraints) to determine a respective cost associated with one or more of the feature points (e.g., determine a respective cost for each tracked feature point). Additionally, the calibration component 102 may determine a final cost based at least on the respective cost(s).

The method 800, at block B806, may include determining, based at least on the cost, to use the one or more values of the one or more parameters for calibrating the first image sensor with the second image sensor. For instance, the calibration component 102 (e.g., the optimization component 122) may determine to use the value(s) of the parameter(s) based at least on the cost. In some examples, the calibration component 102 determines to use the value(s) of the parameter(s) based at least on the cost being less than or equal to a threshold cost.

FIG. 9 is a flow diagram showing a method for verifying one or more values for one or more parameters that calibrate sensors, in accordance with some embodiments of the present disclosure. The method 900, at block B902, may include determining, based at least on first image data generated using a first image sensor and second image data generated using a second image sensor, that a first feature point of a first image represented by the first image data corresponds to a second feature point of a second image represented by the second image data. For instance, the calibration component 102 may receive the first image data 104 generated using the first image sensor 106 and the second image data 108 generated using the second image sensor 110, where the first image data 104 represents at least the first image 116(1) and the second image data 108 represents at least the second image 116(2). The calibration component 102 (e.g., the feature point component 114) may then process the first image 116(1) and the second image 116(2), using one or more techniques associated with feature point tracking, in order to determine that the first feature point from the first image 116(1) corresponds to the second feature point from the second image 116(2).

The method 900, at block B904, may include determining, based at least on one or more values of one or more parameters and the first feature point, a line associated with the second image. For instance, the calibration component 102 (e.g., the verification component 132) may determine, using one or more of the techniques described herein, the line (e.g., the epipolar line) associated with the second image 116(2) using the value(s) of the parameter(s) and the first feature point of the first image 116(1). As described herein, the line may include a horizontal line, a vertical line, and/or any other type of line.

The method 900, at block B906, may include determining, based at least on the second feature point and the line, that the one or more values of the one or more parameters calibrate the first image sensor with the second image sensor. For instance, the calibration component (e.g., the verification component 132) may verify the value(s) of the parameter(s) based at least on the second feature point of the second image 116(2) and the line. As described herein, in some examples, the calibration component 102 makes the verification based at least on the second feature point being located on and/or within a threshold distance to the line. Additionally, in some examples, the calibration component 102 makes the verification using one or more additional tracked feature points between the images 116(1)-(2).

Example Autonomous Vehicle

Figure 10A:
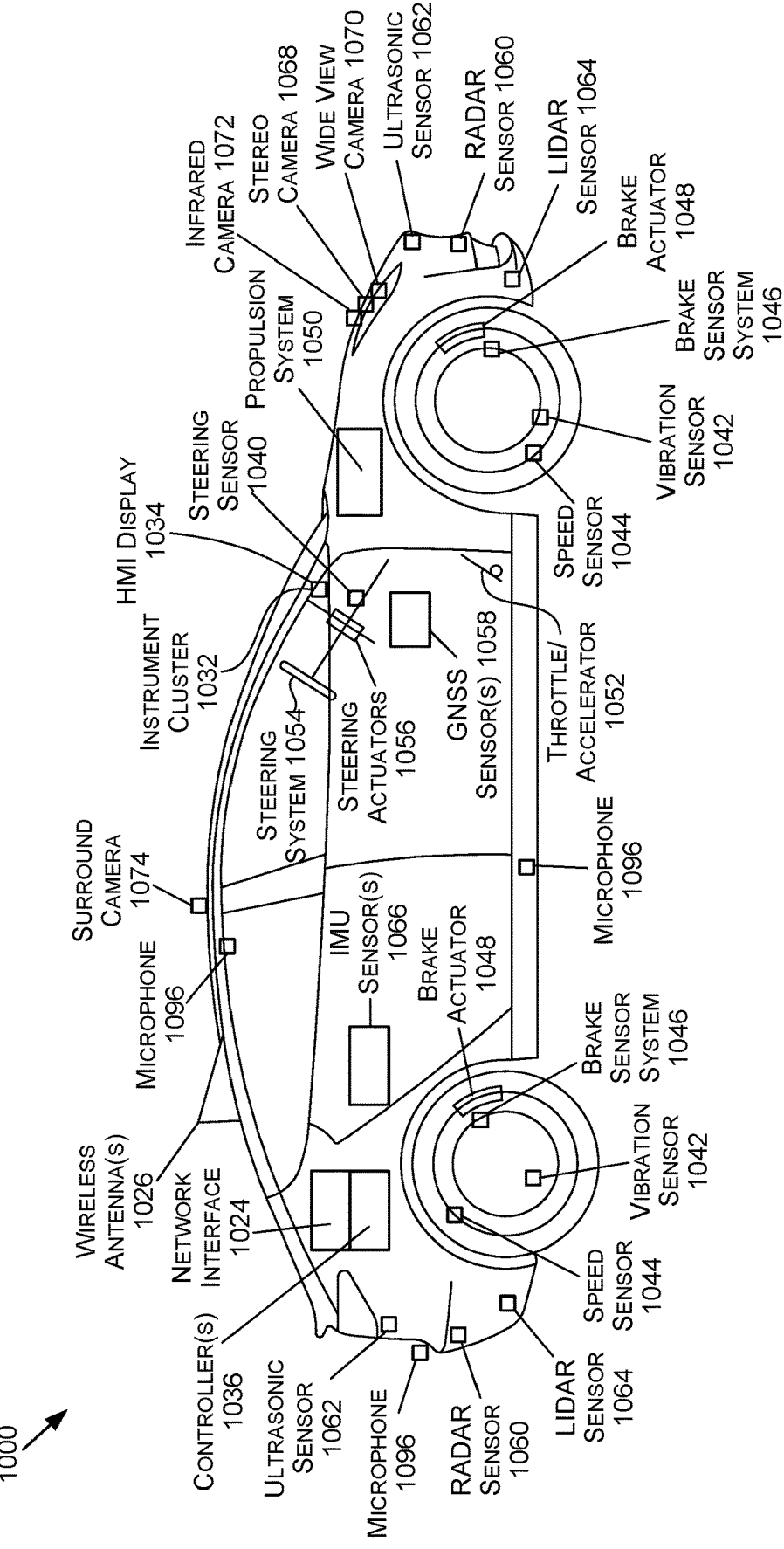
FIG. 10A is an illustration of an example autonomous vehicle, in accordance with some embodiments of the present disclosure.

FIG. 10A is an illustration of an example autonomous vehicle 1000, in accordance with some embodiments of the present disclosure. The autonomous vehicle 1000 (alternatively referred to herein as the "vehicle 1000") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1000 may be capable of functionality in accordance with one or more of Level 3-Level 5 of the autonomous driving levels. The vehicle 1000 may be capable of functionality in accordance with one or more of Level 1-Level 5 of the autonomous driving levels. For example, the vehicle 1000 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1000 or other machine, such as being fully autonomous, being highly autonomous, being conditionally autonomous, being partially autonomous, providing assistive autonomy, being semi-autonomous, being primarily autonomous, or other designation.

The vehicle 1000 may include components such as a chassis, a vehicle body, wheels (e.g., 2, 4, 6, 8, 18, etc.), tires, axles, and other components of a vehicle. The vehicle 1000 may include a propulsion system 1050, such as an internal combustion engine, hybrid electric power plant, an all-electric engine, and/or another propulsion system type. The propulsion system 1050 may be connected to a drive train of the vehicle 1000, which may include a transmission, to enable the propulsion of the vehicle 1000. The propulsion system 1050 may be controlled in response to receiving signals from the throttle/accelerator 1052.

A steering system 1054, which may include a steering wheel, may be used to steer the vehicle 1000 (e.g., along a desired path or route) when the propulsion system 1050 is operating (e.g., when the vehicle is in motion). The steering system 1054 may receive signals from a steering actuator 1056. The steering wheel may be optional for full automation (Level 5) functionality.

The brake sensor system 1046 may be used to operate the vehicle brakes in response to receiving signals from the brake actuators 1048 and/or brake sensors.

Controller(s) 1036, which may include one or more system on chips (SoCs) 1004 (FIG. 10C) and/or GPU(s), may provide signals (e.g., representative of commands) to one or more components and/or systems of the vehicle 1000. For example, the controller(s) may send signals to operate the vehicle brakes via one or more brake actuators 1048, to operate the steering system 1054 via one or more steering actuators 1056, to operate the propulsion system 1050 via one or more throttle/accelerators 1052. The controller(s) 1036 may include one or more onboard (e.g., integrated) computing devices (e.g., supercomputers) that process sensor signals, and output operation commands (e.g., signals representing commands) to enable autonomous driving and/or to assist a human driver in driving the vehicle 1000. The controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In some examples, a single controller 1036 may handle two or more of the above functionalities, two or more controllers 1036 may handle a single functionality, and/or any combination thereof.

The controller(s) 1036 may provide the signals for controlling one or more components and/or systems of the vehicle 1000 in response to sensor data received from one or more sensors (e.g., sensor inputs). The sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit (IMU) sensor(s) 1066 (e.g., accelerometer(s), gyroscope(s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range and/or mid-range camera(s) 1098, speed sensor(s) 1044 (e.g., for measuring the speed of the vehicle 1000), vibration sensor(s) 1042, steering sensor(s) 1040, brake sensor(s) (e.g., as part of the brake sensor system 1046), and/or other sensor types.

One or more of the controller(s) 1036 may receive inputs (e.g., represented by input data) from an instrument cluster 1032 of the vehicle 1000 and provide outputs (e.g., represented by output data, display data, etc.) via a human-machine interface (HMI) display 1034, an audible annunciator, a loudspeaker, and/or via other components of the vehicle 1000. The outputs may include information such as vehicle velocity, speed, time, map data (e.g., the High Definition ("HD") map 1022 of FIG. 10C), location data (e.g., the vehicle's 1000 location, such as on a map), direction, location of other vehicles (e.g., an occupancy grid), information about objects and status of objects as perceived by the controller(s) 1036, etc. For example, the HMI display 1034 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1000 further includes a network interface 1024 which may use one or more wireless antenna(s) 1026 and/or modem(s) to communicate over one or more networks. For example, the network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 1026 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 10B:
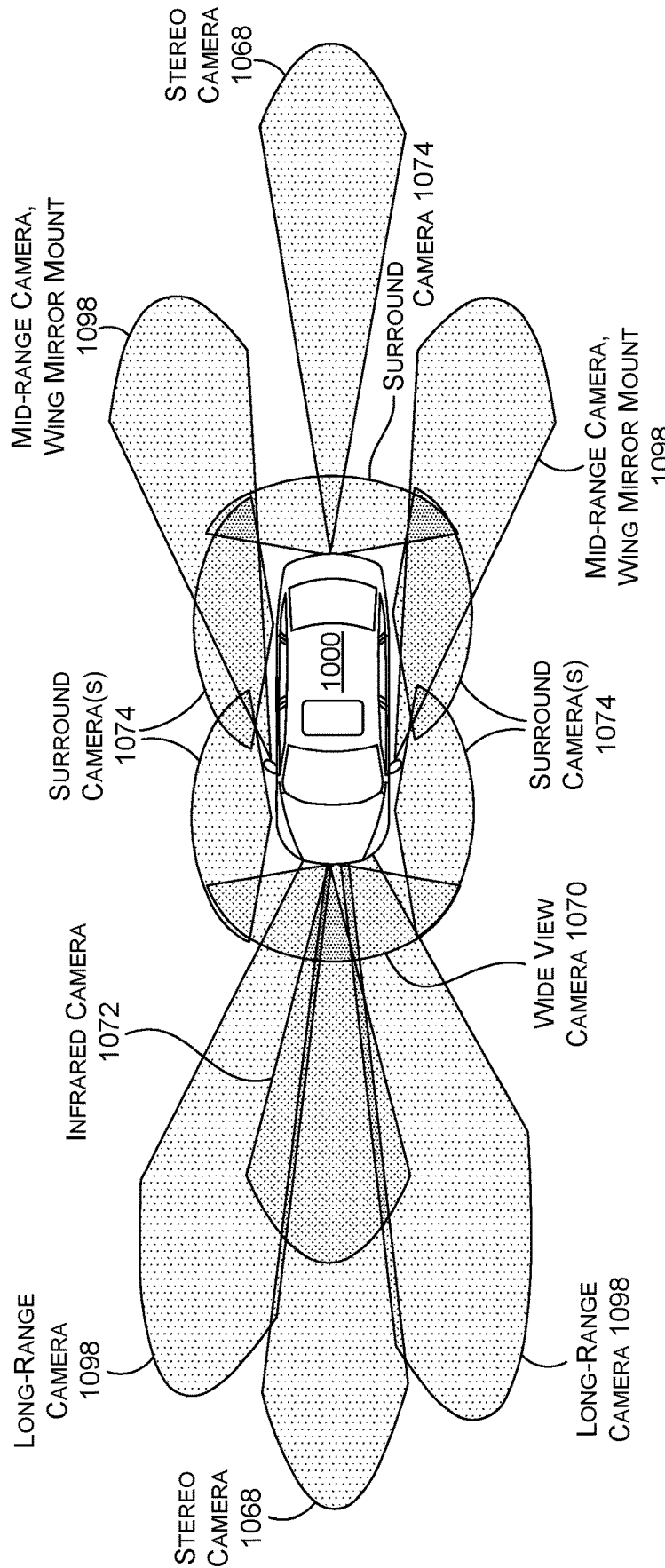
FIG. 10B is an example of camera locations and fields of view for the example autonomous vehicle of FIG. 10A, in accordance with some embodiments of the present disclosure.

FIG. 10B is an example of camera locations and fields of view for the example autonomous vehicle 1000 of FIG. 10A, in accordance with some embodiments of the present disclosure. The cameras and respective fields of view are one example embodiment and are not intended to be limiting. For example, additional and/or alternative cameras may be included and/or the cameras may be located at different locations on the vehicle 1000.

The camera types for the cameras may include, but are not limited to, digital cameras that may be adapted for use with the components and/or systems of the vehicle 1000. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1000 (e.g., front-facing cameras) may be used for surround view, to help identify forward facing paths and obstacles, as well aid in, with the help of one or more controllers 1036 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 1070 that may be used to perceive objects coming into view from the periphery (e.g., pedestrians, crossing traffic or bicycles). Although only one wide-view camera is illustrated in FIG. 10B, there may be any number (including zero) of wide-view cameras 1070 on the vehicle 1000. In addition, any number of long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

Any number of stereo cameras 1068 may also be included in a front-facing configuration. In at least one embodiment, one or more of stereo camera(s) 1068 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1000 (e.g., side-view cameras) may be used for surround view, providing information used to create and update the occupancy grid, as well as to generate side impact collision warnings. For example, surround camera(s) 1074 (e.g., four surround cameras 1074 as illustrated in FIG. 10B) may be positioned to on the vehicle 1000. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1000 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 10C:
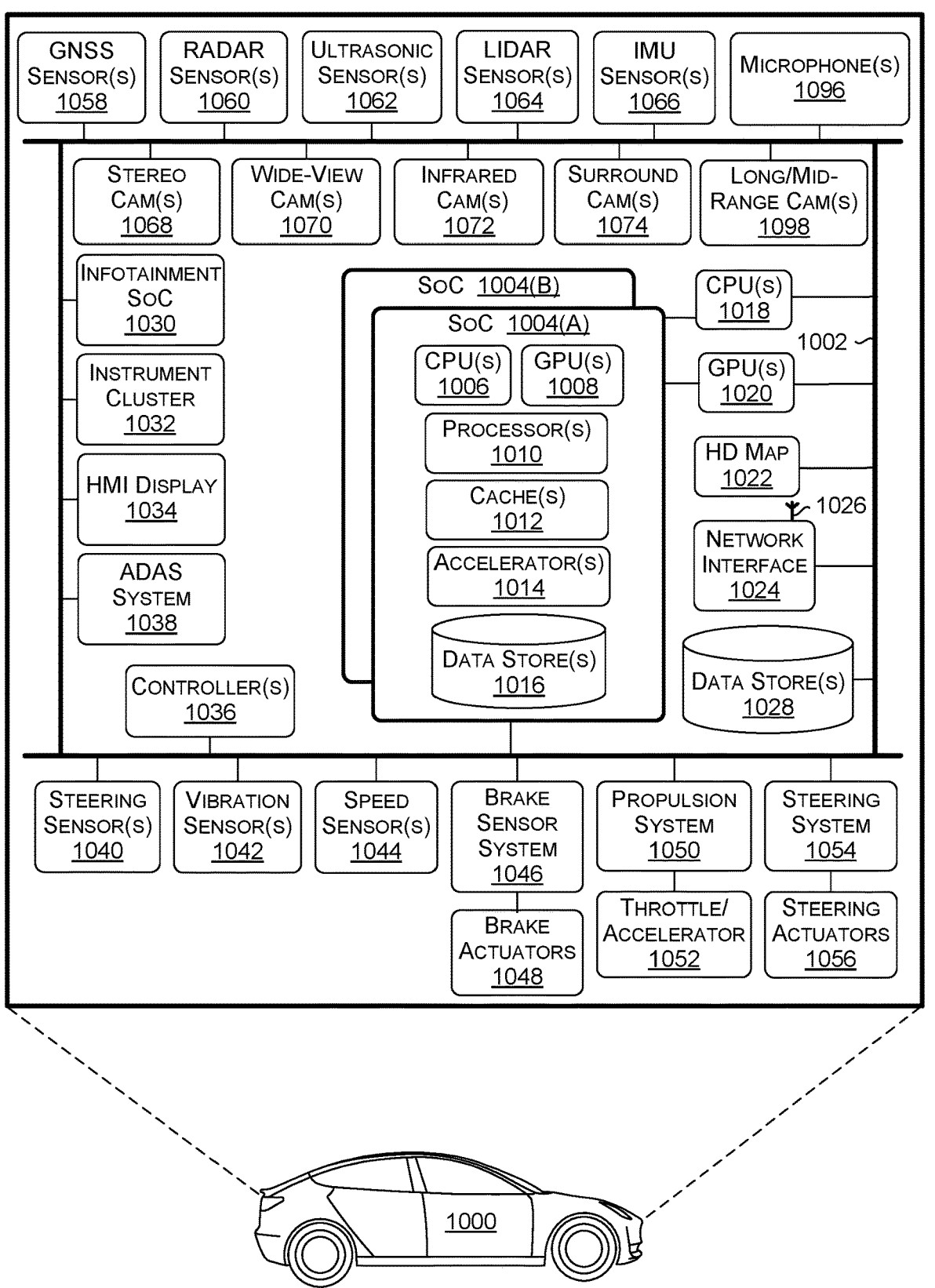
FIG. 10C is a block diagram of an example system architecture for the example autonomous vehicle of FIG. 10A, in accordance with some embodiments of the present disclosure.

FIG. 10C is a block diagram of an example system architecture for the example autonomous vehicle 1000 of FIG. 10A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1000 in FIG. 10C are illustrated as being connected via bus 1002. The bus 1002 may include a Controller Area Network (CAN) data interface (alternatively referred to herein as a "CAN bus"). A CAN may be a network inside the vehicle 1000 used to aid in control of various features and functionality of the vehicle 1000, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1002 is described herein as being a CAN bus, this is not intended to be limiting. For example, in addition to, or alternatively from, the CAN bus, FlexRay and/or Ethernet may be used. Additionally, although a single line is used to represent the bus 1002, this is not intended to be limiting. For example, there may be any number of busses 1002, which may include one or more CAN busses, one or more FlexRay busses, one or more Ethernet busses, and/or one or more other types of busses using a different protocol. In some examples, two or more busses 1002 may be used to perform different functions, and/or may be used for redundancy. For example, a first bus 1002 may be used for collision avoidance functionality and a second bus 1002 may be used for actuation control. In any example, each bus 1002 may communicate with any of the components of the vehicle 1000, and two or more busses 1002 may communicate with the same components. In some examples, each SoC 1004, each controller 1036, and/or each computer within the vehicle may have access to the same input data (e.g., inputs from sensors of the vehicle 1000), and may be connected to a common bus, such the CAN bus.

The vehicle 1000 may include one or more controller(s) 1036, such as those described herein with respect to FIG. 10A. The controller(s) 1036 may be used for a variety of functions. The controller(s) 1036 may be coupled to any of the various other components and systems of the vehicle 1000, and may be used for control of the vehicle 1000, artificial intelligence of the vehicle 1000, infotainment for the vehicle 1000, and/or the like.

The vehicle 1000 may include a system(s) on a chip (SoC) 1004. The SoC 1004 may include CPU(s) 1006, GPU(s) 1008, processor(s) 1010, cache(s) 1012, accelerator(s) 1014, data store(s) 1016, and/or other components and features not illustrated. The SoC(s) 1004 may be used to control the vehicle 1000 in a variety of platforms and systems. For example, the SoC(s) 1004 may be combined in a system (e.g., the system of the vehicle 1000) with an HD map 1022 which may obtain map refreshes and/or updates via a network interface 1024 from one or more servers (e.g., server(s) 1078 of FIG. 10D).

The CPU(s) 1006 may include a CPU cluster or CPU complex (alternatively referred to herein as a "CCPLEX"). The CPU(s) 1006 may include multiple cores and/or L2 caches. For example, in some embodiments, the CPU(s) 1006 may include eight cores in a coherent multi-processor configuration. In some embodiments, the CPU(s) 1006 may include four dual-core clusters where each cluster has a dedicated L2 cache (e.g., a 2 MB L2 cache). The CPU(s) 1006 (e.g., the CCPLEX) may be configured to support simultaneous cluster operation enabling any combination of the clusters of the CPU(s) 1006 to be active at any given time.

The CPU(s) 1006 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1006 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1008 may include an integrated GPU (alternatively referred to herein as an "iGPU"). The GPU(s) 1008 may be programmable and may be efficient for parallel workloads. The GPU(s) 1008, in some examples, may use an enhanced tensor instruction set. The GPU(s) 1008 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1008 may include at least eight streaming microprocessors. The GPU(s) 1008 may use compute application programming interface(s) (API(s)). In addition, the GPU(s) 1008 may use one or more parallel computing platforms and/or programming models (e.g., NVIDIA's CUDA).

The GPU(s) 1008 may be power-optimized for best performance in automotive and embedded use cases. For example, the GPU(s) 1008 may be fabricated on a Fin field-effect transistor (FinFET). However, this is not intended to be limiting and the GPU(s) 1008 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1008 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1008 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1008 to access the CPU(s) 1006 page tables directly. In such examples, when the GPU(s) 1008 memory management unit (MMU) experiences a miss, an address translation request may be transmitted to the CPU(s) 1006. In response, the CPU(s) 1006 may look in its page tables for the virtual-to-physical mapping for the address and transmits the translation back to the GPU(s) 1008. As such, unified memory technology may allow a single unified virtual address space for memory of both the CPU(s) 1006 and the GPU(s) 1008, thereby simplifying the GPU(s) 1008 programming and porting of applications to the GPU(s) 1008.

In addition, the GPU(s) 1008 may include an access counter that may keep track of the frequency of access of the GPU(s) 1008 to memory of other processors. The access counter may help ensure that memory pages are moved to the physical memory of the processor that is accessing the pages most frequently.

The SoC(s) 1004 may include any number of cache(s) 1012, including those described herein. For example, the cache(s) 1012 may include an L3 cache that is available to both the CPU(s) 1006 and the GPU(s) 1008 (e.g., that is connected both the CPU(s) 1006 and the GPU(s) 1008). The cache(s) 1012 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1004 may include an arithmetic logic unit(s) (ALU(s)) which may be leveraged in performing processing with respect to any of the variety of tasks or operations of the vehicle 1000—such as processing DNNs. In addition, the SoC(s) 1004 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1006 and/or GPU(s) 1008.

The SoC(s) 1004 may include one or more accelerators 1014 (e.g., hardware accelerators, software accelerators, or a combination thereof). For example, the SoC(s) 1004 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1008 and to off-load some of the tasks of the GPU(s) 1008 (e.g., to free up more cycles of the GPU(s) 1008 for performing other tasks). As an example, the accelerator(s) 1014 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1014 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1008, and by using an inference accelerator, for example, a designer may target either the DLA(s) or the GPU(s) 1008 for any function. For example, the designer may focus processing of CNNs and floating point operations on the DLA(s) and leave other functions to the GPU(s) 1008 and/or other accelerator(s) 1014.

The accelerator(s) 1014 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1006. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1014 (e.g., the hardware acceleration cluster) may include a computer vision network on-chip and SRAM, for providing a high-bandwidth, low latency SRAM for the accelerator(s) 1014. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1004 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1014 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1066 output that correlates with the vehicle 1000 orientation, distance, 3D location estimates of the object obtained from the neural network and/or other sensors (e.g., LIDAR sensor(s) 1064 or RADAR sensor(s) 1060), among others.

The SoC(s) 1004 may include data store(s) 1016 (e.g., memory). The data store(s) 1016 may be on-chip memory of the SoC(s) 1004, which may store neural networks to be executed on the GPU and/or the DLA. In some examples, the data store(s) 1016 may be large enough in capacity to store multiple instances of neural networks for redundancy and safety. The data store(s) 1012 may comprise L2 or L3 cache(s) 1012. Reference to the data store(s) 1016 may include reference to the memory associated with the PVA, DLA, and/or other accelerator(s) 1014, as described herein.

The SoC(s) 1004 may include one or more processor(s) 1010 (e.g., embedded processors). The processor(s) 1010 may include a boot and power management processor that may be a dedicated processor and subsystem to handle boot power and management functions and related security enforcement. The boot and power management processor may be a part of the SoC(s) 1004 boot sequence and may provide runtime power management services. The boot power and management processor may provide clock and voltage programming, assistance in system low power state transitions, management of SoC(s) 1004 thermals and temperature sensors, and/or management of the SoC(s) 1004 power states. Each temperature sensor may be implemented as a ring-oscillator whose output frequency is proportional to temperature, and the SoC(s) 1004 may use the ring-oscillators to detect temperatures of the CPU(s) 1006, GPU(s) 1008, and/or accelerator(s) 1014. If temperatures are determined to exceed a threshold, the boot and power management processor may enter a temperature fault routine and put the SoC(s) 1004 into a lower power state and/or put the vehicle 1000 into a chauffeur to safe stop mode (e.g., bring the vehicle 1000 to a safe stop).

The processor(s) 1010 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1010 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1010 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1010 may further include a real-time camera engine that may include a dedicated processor subsystem for handling real-time camera management.

The processor(s) 1010 may further include a high-dynamic range signal processor that may include an image signal processor that is a hardware engine that is part of the camera processing pipeline.

The processor(s) 1010 may include a video image compositor that may be a processing block (e.g., implemented on a microprocessor) that implements video post-processing functions needed by a video playback application to produce the final image for the player window. The video image compositor may perform lens distortion correction on wide-view camera(s) 1070, surround camera(s) 1074, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1008 is not required to continuously render new surfaces. Even when the GPU(s) 1008 is powered on and active doing 3D rendering, the video image compositor may be used to offload the GPU(s) 1008 to improve performance and responsiveness.

The SoC(s) 1004 may further include a mobile industry processor interface (MIPI) camera serial interface for receiving video and input from cameras, a high-speed interface, and/or a video input block that may be used for camera and related pixel input functions. The SoC(s) 1004 may further include an input/output controller(s) that may be controlled by software and may be used for receiving I/O signals that are uncommitted to a specific role.

The SoC(s) 1004 may further include a broad range of peripheral interfaces to enable communication with peripherals, audio codecs, power management, and/or other devices. The SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus). The SoC(s) 1004 may further include dedicated high-performance mass storage controllers that may include their own DMA engines, and that may be used to free the CPU(s) 1006 from routine data management tasks.

The SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1004 may be faster, more reliable, and even more energy-efficient and space-efficient than conventional systems. For example, the accelerator(s) 1014, when combined with the CPU(s) 1006, the GPU(s) 1008, and the data store(s) 1016, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1020) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1008.

In some examples, a CNN for facial recognition and vehicle owner identification may use data from camera sensors to identify the presence of an authorized driver and/or owner of the vehicle 1000. The always on sensor processing engine may be used to unlock the vehicle when the owner approaches the driver door and turn on the lights, and, in security mode, to disable the vehicle when the owner leaves the vehicle. In this way, the SoC(s) 1004 provide for security against theft and/or carjacking.

In another example, a CNN for emergency vehicle detection and identification may use data from microphones 1096 to detect and identify emergency vehicle sirens. In contrast to conventional systems, that use general classifiers to detect sirens and manually extract features, the SoC(s) 1004 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1058. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1062, until the emergency vehicle(s) passes.

The vehicle may include a CPU(s) 1018 (e.g., discrete CPU(s), or dCPU(s)), that may be coupled to the SoC(s) 1004 via a high-speed interconnect (e.g., PCIe). The CPU(s) 1018 may include an X86 processor, for example. The CPU(s) 1018 may be used to perform any of a variety of functions, including arbitrating potentially inconsistent results between ADAS sensors and the SoC(s) 1004, and/or monitoring the status and health of the controller(s) 1036 and/or infotainment SoC 1030, for example.

The vehicle 1000 may include a GPU(s) 1020 (e.g., discrete GPU(s), or dGPU(s)), that may be coupled to the SoC(s) 1004 via a high-speed interconnect (e.g., NVIDIA's NVLINK). The GPU(s) 1020 may provide additional artificial intelligence functionality, such as by executing redundant and/or different neural networks, and may be used to train and/or update neural networks based on input (e.g., sensor data) from sensors of the vehicle 1000.

The vehicle 1000 may further include the network interface 1024 which may include one or more wireless antennas 1026 (e.g., one or more wireless antennas for different communication protocols, such as a cellular antenna, a Bluetooth antenna, etc.). The network interface 1024 may be used to enable wireless connectivity over the Internet with the cloud (e.g., with the server(s) 1078 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1000 information about vehicles in proximity to the vehicle 1000 (e.g., vehicles in front of, on the side of, and/or behind the vehicle 1000). This functionality may be part of a cooperative adaptive cruise control functionality of the vehicle 1000.

The network interface 1024 may include a SoC that provides modulation and demodulation functionality and enables the controller(s) 1036 to communicate over wireless networks. The network interface 1024 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1000 may further include data store(s) 1028 which may include off-chip (e.g., off the SoC(s) 1004) storage. The data store(s) 1028 may include one or more storage elements including RAM, SRAM, DRAM, VRAM, Flash, hard disks, and/or other components and/or devices that may store at least one bit of data.

The vehicle 1000 may further include GNSS sensor(s) 1058. The GNSS sensor(s) 1058 (e.g., GPS, assisted GPS sensors, differential GPS (DGPS) sensors, etc.), to assist in mapping, perception, occupancy grid generation, and/or path planning functions. Any number of GNSS sensor(s) 1058 may be used, including, for example and without limitation, a GPS using a USB connector with an Ethernet to Serial (RS-232) bridge.

The vehicle 1000 may further include RADAR sensor(s) 1060. The RADAR sensor(s) 1060 may be used by the vehicle 1000 for long-range vehicle detection, even in darkness and/or severe weather conditions. RADAR functional safety levels may be ASIL B. The RADAR sensor(s) 1060 may use the CAN and/or the bus 1002 (e.g., to transmit data generated by the RADAR sensor(s) 1060) for control and to access object tracking data, with access to Ethernet to access raw data in some examples. A wide variety of RADAR sensor types may be used. For example, and without limitation, the RADAR sensor(s) 1060 may be suitable for front, rear, and side RADAR use. In some example, Pulse Doppler RADAR sensor(s) are used.

The RADAR sensor(s) 1060 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1060 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1000 surroundings at higher speeds with minimal interference from traffic in adjacent lanes. The other two antennae may expand the field of view, making it possible to quickly detect vehicles entering or leaving the vehicle's 1000 lane.

Mid-range RADAR systems may include, as an example, a range of up to 1060 m (front) or 80 m (rear), and a field of view of up to 42 degrees (front) or 1050 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1000 may further include ultrasonic sensor(s) 1062. The ultrasonic sensor(s) 1062, which may be positioned at the front, back, and/or the sides of the vehicle 1000, may be used for park assist and/or to create and update an occupancy grid. A wide variety of ultrasonic sensor(s) 1062 may be used, and different ultrasonic sensor(s) 1062 may be used for different ranges of detection (e.g., 2.5 m, 4 m). The ultrasonic sensor(s) 1062 may operate at functional safety levels of ASIL B.

The vehicle 1000 may include LIDAR sensor(s) 1064. The LIDAR sensor(s) 1064 may be used for object and pedestrian detection, emergency braking, collision avoidance, and/or other functions. The LIDAR sensor(s) 1064 may be functional safety level ASIL B. In some examples, the vehicle 1000 may include multiple LIDAR sensors 1064 (e.g., two, four, six, etc.) that may use Ethernet (e.g., to provide data to a Gigabit Ethernet switch).

In some examples, the LIDAR sensor(s) 1064 may be capable of providing a list of objects and their distances for a 360-degree field of view. Commercially available LIDAR sensor(s) 1064 may have an advertised range of approximately 1000 m, with an accuracy of 2 cm-3 cm, and with support for a 1000 Mbps Ethernet connection, for example.

In some examples, one or more non-protruding LIDAR sensors 1064 may be used. In such examples, the LIDAR sensor(s) 1064 may be implemented as a small device that may be embedded into the front, rear, sides, and/or corners of the vehicle 1000. The LIDAR sensor(s) 1064, in such examples, may provide up to a 120-degree horizontal and 35-degree vertical field-of-view, with a 200 m range even for low-reflectivity objects. Front-mounted LIDAR sensor(s) 1064 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1000. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1064 may be less susceptible to motion blur, vibration, and/or shock.

The vehicle may further include IMU sensor(s) 1066. The IMU sensor(s) 1066 may be located at a center of the rear axle of the vehicle 1000, in some examples. The IMU sensor(s) 1066 may include, for example and without limitation, an accelerometer(s), a magnetometer(s), a gyroscope(s), a magnetic compass(es), and/or other sensor types. In some examples, such as in six-axis applications, the IMU sensor(s) 1066 may include accelerometers and gyroscopes, while in nine-axis applications, the IMU sensor(s) 1066 may include accelerometers, gyroscopes, and magnetometers.

In some embodiments, the IMU sensor(s) 1066 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1066 may enable the vehicle 1000 to estimate heading without requiring input from a magnetic sensor by directly observing and correlating the changes in velocity from GPS to the IMU sensor(s) 1066. In some examples, the IMU sensor(s) 1066 and the GNSS sensor(s) 1058 may be combined in a single integrated unit.

The vehicle may include microphone(s) 1096 placed in and/or around the vehicle 1000. The microphone(s) 1096 may be used for emergency vehicle detection and identification, among other things.

The vehicle may further include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1000. The types of cameras used depends on the embodiments and requirements for the vehicle 1000, and any combination of camera types may be used to provide the necessary coverage around the vehicle 1000. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 10A and FIG. 10B.

The vehicle 1000 may further include vibration sensor(s) 1042. The vibration sensor(s) 1042 may measure vibrations of components of the vehicle, such as the axle(s). For example, changes in vibrations may indicate a change in road surfaces. In another example, when two or more vibration sensors 1042 are used, the differences between the vibrations may be used to determine friction or slippage of the road surface (e.g., when the difference in vibration is between a power-driven axle and a freely rotating axle).

The vehicle 1000 may include an ADAS system 1038. The ADAS system 1038 may include a SoC, in some examples. The ADAS system 1038 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1060, LIDAR sensor(s) 1064, and/or a camera(s). The ACC systems may include longitudinal ACC and/or lateral ACC. Longitudinal ACC monitors and controls the distance to the vehicle immediately ahead of the vehicle 1000 and automatically adjust the vehicle speed to maintain a safe distance from vehicles ahead. Lateral ACC performs distance keeping, and advises the vehicle 1000 to change lanes when necessary. Lateral ACC is related to other ADAS applications such as LCA and CWS.

CACC uses information from other vehicles that may be received via the network interface 1024 and/or the wireless antenna(s) 1026 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1000), while the I2V communication concept provides information about traffic further ahead. CACC systems may include either or both I2V and V2V information sources. Given the information of the vehicles ahead of the vehicle 1000, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1060, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1060, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1000 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1000 if the vehicle 1000 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1000 is backing up. Some RCTW systems include AEB to ensure that the vehicle brakes are applied to avoid a crash. RCTW systems may use one or more rear-facing RADAR sensor(s) 1060, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1000, the vehicle 1000 itself must, in the case of conflicting results, decide whether to heed the result from a primary computer or a secondary computer (e.g., a first controller 1036 or a second controller 1036). For example, in some embodiments, the ADAS system 1038 may be a backup and/or secondary computer for providing perception information to a backup computer rationality module. The backup computer rationality monitor may run a redundant diverse software on hardware components to detect faults in perception and dynamic driving tasks. Outputs from the ADAS system 1038 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1004.

In other examples, ADAS system 1038 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1038 may be fed into the primary computer's perception block and/or the primary computer's dynamic driving task block. For example, if the ADAS system 1038 indicates a forward crash warning due to an object immediately ahead, the perception block may use this information when identifying objects. In other examples, the secondary computer may have its own neural network which is trained and thus reduces the risk of false positives, as described herein.

The vehicle 1000 may further include the infotainment SoC 1030 (e.g., an in-vehicle infotainment system (IVI)). Although illustrated and described as a SoC, the infotainment system may not be a SoC, and may include two or more discrete components. The infotainment SoC 1030 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1000. For example, the infotainment SoC 1030 may radios, disk players, navigation systems, video players, USB and Bluetooth connectivity, carputers, in-car entertainment, Wi-Fi, steering wheel audio controls, hands free voice control, a heads-up display (HUD), an HMI display 1034, a telematics device, a control panel (e.g., for controlling and/or interacting with various components, features, and/or systems), and/or other components. The infotainment SoC 1030 may further be used to provide information (e.g., visual and/or audible) to a user(s) of the vehicle, such as information from the ADAS system 1038, autonomous driving information such as planned vehicle maneuvers, trajectories, surrounding environment information (e.g., intersection information, vehicle information, road information, etc.), and/or other information.

The infotainment SoC 1030 may include GPU functionality. The infotainment SoC 1030 may communicate over the bus 1002 (e.g., CAN bus, Ethernet, etc.) with other devices, systems, and/or components of the vehicle 1000. In some examples, the infotainment SoC 1030 may be coupled to a supervisory MCU such that the GPU of the infotainment system may perform some self-driving functions in the event that the primary controller(s) 1036 (e.g., the primary and/or backup computers of the vehicle 1000) fail. In such an example, the infotainment SoC 1030 may put the vehicle 1000 into a chauffeur to safe stop mode, as described herein.

The vehicle 1000 may further include an instrument cluster 1032 (e.g., a digital dash, an electronic instrument cluster, a digital instrument panel, etc.). The instrument cluster 1032 may include a controller and/or supercomputer (e.g., a discrete controller or supercomputer). The instrument cluster 1032 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1030 and the instrument cluster 1032. In other words, the instrument cluster 1032 may be included as part of the infotainment SoC 1030, or vice versa.

Figure 10D:
FIG. 10D is a system diagram for communication between cloud-based server(s) and the example autonomous vehicle of FIG. 10A, in accordance with some embodiments of the present disclosure.

FIG. 10D is a system diagram for communication between cloud-based server(s) and the example autonomous vehicle 1000 of FIG. 10A, in accordance with some embodiments of the present disclosure. The system 1076 may include server(s) 1078, network(s) 1090, and vehicles, including the vehicle 1000. The server(s) 1078 may include a plurality of GPUs 1084(A)-1084(H) (collectively referred to herein as GPUs 1084), PCIe switches 1082(A)-1082(H) (collectively referred to herein as PCIe switches 1082), and/or CPUs 1080(A)-1080(B) (collectively referred to herein as CPUs 1080). The GPUs 1084, the CPUs 1080, and the PCIe switches may be interconnected with high-speed interconnects such as, for example and without limitation, NVLink interfaces 1088 developed by NVIDIA and/or PCIe connections 1086. In some examples, the GPUs 1084 are connected via NVLink and/or NVSwitch SoC and the GPUs 1084 and the PCIe switches 1082 are connected via PCIe interconnects. Although eight GPUs 1084, two CPUs 1080, and two PCIe switches are illustrated, this is not intended to be limiting. Depending on the embodiment, each of the server(s) 1078 may include any number of GPUs 1084, CPUs 1080, and/or PCIe switches. For example, the server(s) 1078 may each include eight, sixteen, thirty-two, and/or more GPUs 1084.

The server(s) 1078 may receive, over the network(s) 1090 and from the vehicles, image data representative of images showing unexpected or changed road conditions, such as recently commenced road-work. The server(s) 1078 may transmit, over the network(s) 1090 and to the vehicles, neural networks 1092, updated neural networks 1092, and/or map information 1094, including information regarding traffic and road conditions. The updates to the map information 1094 may include updates for the HD map 1022, such as information regarding construction sites, potholes, detours, flooding, and/or other obstructions. In some examples, the neural networks 1092, the updated neural networks 1092, and/or the map information 1094 may have resulted from new training and/or experiences represented in data received from any number of vehicles in the environment, and/or based on training performed at a datacenter (e.g., using the server(s) 1078 and/or other servers).

The server(s) 1078 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1090, and/or the machine learning models may be used by the server(s) 1078 to remotely monitor the vehicles.

In some examples, the server(s) 1078 may receive data from the vehicles and apply the data to up-to-date real-time neural networks for real-time intelligent inferencing. The server(s) 1078 may include deep-learning supercomputers and/or dedicated AI computers powered by GPU(s) 1084, such as a DGX and DGX Station machines developed by NVIDIA. However, in some examples, the server(s) 1078 may include deep learning infrastructure that use only CPU-powered datacenters.

The deep-learning infrastructure of the server(s) 1078 may be capable of fast, real-time inferencing, and may use that capability to evaluate and verify the health of the processors, software, and/or associated hardware in the vehicle 1000. For example, the deep-learning infrastructure may receive periodic updates from the vehicle 1000, such as a sequence of images and/or objects that the vehicle 1000 has located in that sequence of images (e.g., via computer vision and/or other machine learning object classification techniques). The deep-learning infrastructure may run its own neural network to identify the objects and compare them with the objects identified by the vehicle 1000 and, if the results do not match and the infrastructure concludes that the AI in the vehicle 1000 is malfunctioning, the server(s) 1078 may transmit a signal to the vehicle 1000 instructing a fail-safe computer of the vehicle 1000 to assume control, notify the passengers, and complete a safe parking maneuver.

For inferencing, the server(s) 1078 may include the GPU(s) 1084 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 11:
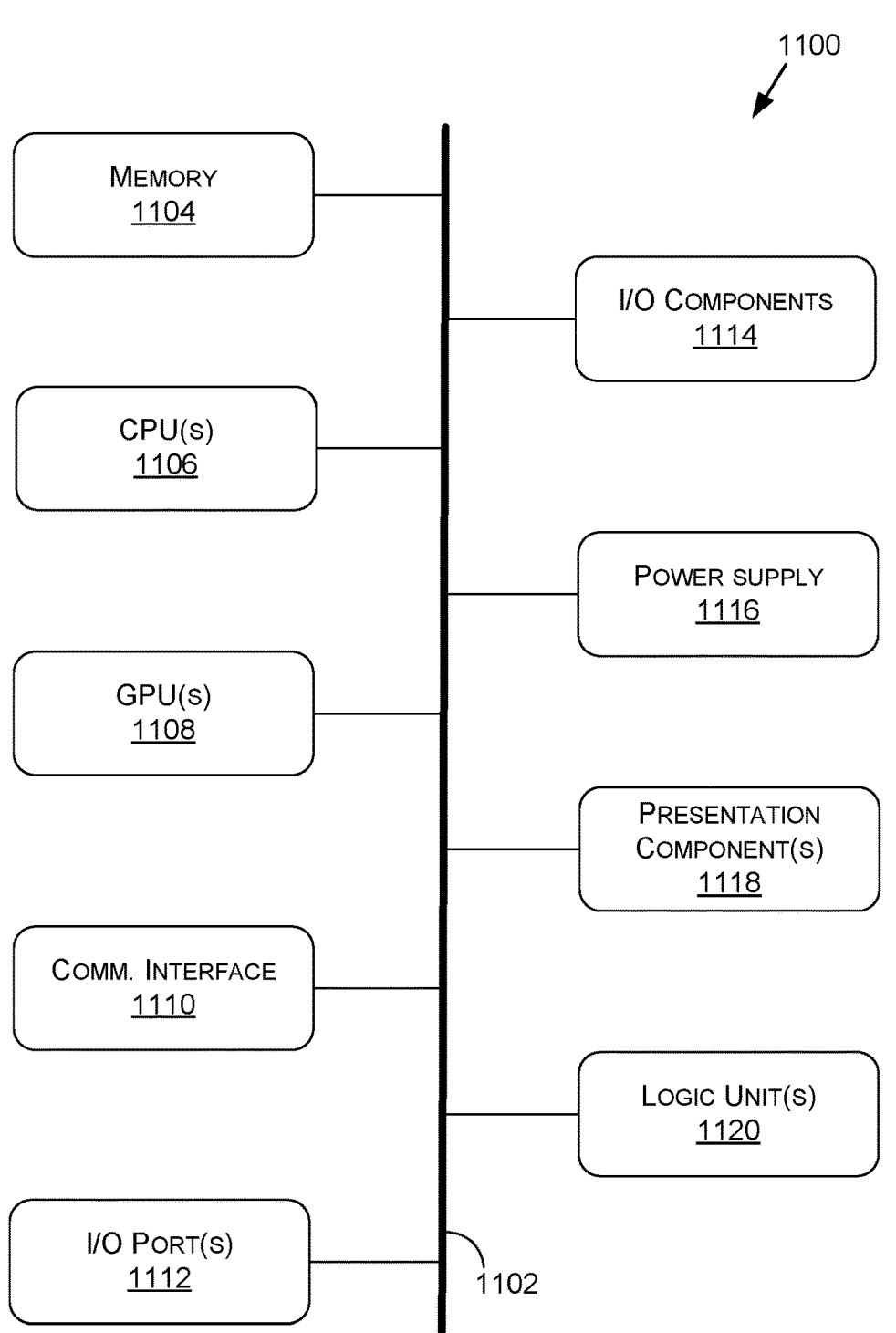
FIG. 11 is a block diagram of an example computing device suitable for use in implementing some embodiments of the present disclosure.

FIG. 11 is a block diagram of an example computing device(s) 1100 suitable for use in implementing some embodiments of the present disclosure. Computing device 1100 may include an interconnect system 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, one or more presentation components 1118 (e.g., display(s)), and one or more logic units 1120. In at least one embodiment, the computing device(s) 1100 may comprise one or more virtual machines (VMs), and/or any of the components thereof may comprise virtual components (e.g., virtual hardware components). For non-limiting examples, one or more of the GPUs 1108 may comprise one or more vGPUs, one or more of the CPUs 1106 may comprise one or more vCPUs, and/or one or more of the logic units 1120 may comprise one or more virtual logic units. As such, a computing device(s) 1100 may include discrete components (e.g., a full GPU dedicated to the computing device 1100), virtual components (e.g., a portion of a GPU dedicated to the computing device 1100), or a combination thereof.

Although the various blocks of FIG. 11 are shown as connected via the interconnect system 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The interconnect system 1102 may represent one or more links or busses, such as an address bus, a data bus, a control bus, or a combination thereof. The interconnect system 1102 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1106 may be directly connected to the memory 1104. Further, the CPU 1106 may be directly connected to the GPU 1108. Where there is direct, or point-to-point connection between components, the interconnect system 1102 may include a PCIe link to carry out the connection. In these examples, a PCI bus need not be included in the computing device 1100.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute at least some of the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

In addition to or alternatively from the CPU(s) 1106, the GPU(s) 1108 may be configured to execute at least some of the computer-readable instructions to control one or more components of the computing device 1100 to perform one or more of the methods and/or processes described herein. One or more of the GPU(s) 1108 may be an integrated GPU (e.g., with one or more of the CPU(s) 1106 and/or one or more of the GPU(s) 1108 may be a discrete GPU. In embodiments, one or more of the GPU(s) 1108 may be a coprocessor of one or more of the CPU(s) 1106. The GPU(s) 1108 may be used by the computing device 1100 to render graphics (e.g., 3D graphics) or perform general purpose computations. For example, the GPU(s) 1108 may be used for General-Purpose computing on GPUs (GPGPU). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data or any other suitable data, such as GPGPU data. The display memory may be included as part of the memory 1104. The GPU(s) 1108 may include two or more GPUs operating in parallel (e.g., via a link). The link may directly connect the GPUs (e.g., using NVLINK) or may connect the GPUs through a switch (e.g., using NVSwitch). When combined together, each GPU 1108 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1106 and/or the GPU(s) 1108, the logic unit(s) 1120 may be configured to execute at least some of the computer-readable instructions to control one or more components of the computing device 1100 to perform one or more of the methods and/or processes described herein. In embodiments, the CPU(s) 1106, the GPU(s) 1108, and/or the logic unit(s) 1120 may discretely or jointly perform any combination of the methods, processes and/or portions thereof. One or more of the logic units 1120 may be part of and/or integrated in one or more of the CPU(s) 1106 and/or the GPU(s) 1108 and/or one or more of the logic units 1120 may be discrete components or otherwise external to the CPU(s) 1106 and/or the GPU(s) 1108. In embodiments, one or more of the logic units 1120 may be a coprocessor of one or more of the CPU(s) 1106 and/or one or more of the GPU(s) 1108.

Examples of the logic unit(s) 1120 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1120 and/or communication interface 1110 may include one or more data processing units (DPUs) to transmit data received over a network and/or through interconnect system 1102 directly to (e.g., a memory of) one or more GPU(s) 1108.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, DPUs, etc.), and output the data (e.g., as an image, video, sound, etc.).

Example Data Center

Figure 12:
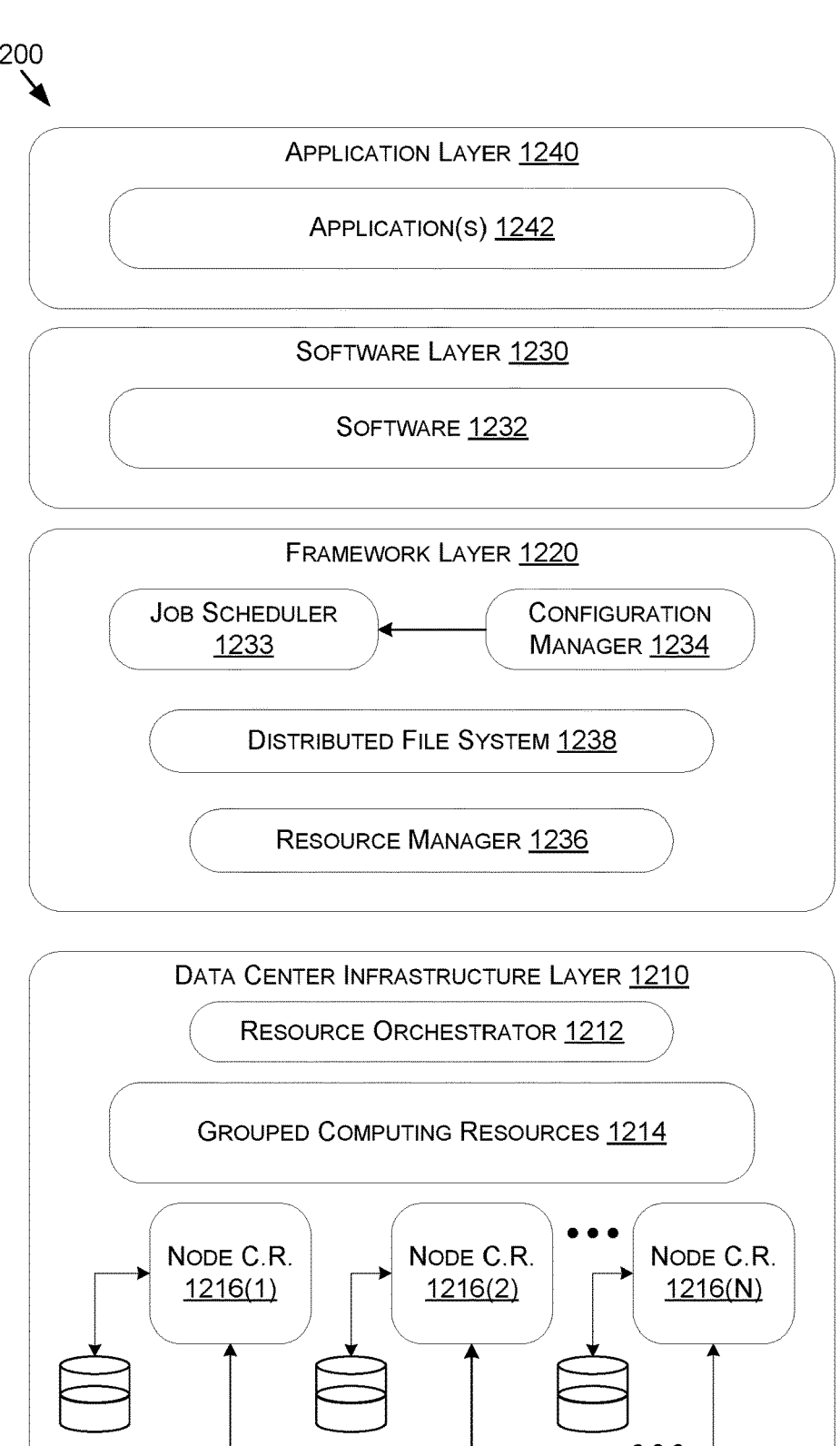
FIG. 12 is a block diagram of an example data center suitable for use in implementing some embodiments of the present disclosure.

FIG. 12 illustrates an example data center 1200 that may be used in at least one embodiments of the present disclosure. The data center 1200 may include a data center infrastructure layer 1210, a framework layer 1220, a software layer 1230, and/or an application layer 1240.

As shown in FIG. 12, the data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1216(1)-1216(N) may correspond to a server having one or more of the above-mentioned computing resources. In addition, in some embodiments, the node C.R.s 1216(1)-12161 (N) may include one or more virtual components, such as vGPUs, vCPUs, and/or the like, and/or one or more of the node C.R.s 1216(1)-1216(N) may correspond to a virtual machine (VM).

In at least one embodiment, grouped computing resources 1214 may include separate groupings of node C.R.s 1216 housed within one or more racks (not shown), or many racks housed in data centers at various geographical locations (also not shown). Separate groupings of node C.R.s 1216 within grouped computing resources 1214 may include grouped compute, network, memory or storage resources that may be configured or allocated to support one or more workloads. In at least one embodiment, several node C.R.s 1216 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1212 may configure or otherwise control one or more node C.R.s 1216(1)-1216(N) and/or grouped computing resources 1214. In at least one embodiment, resource orchestrator 1212 may include a software design infrastructure (SDI) management entity for the data center 1200. The resource orchestrator 1212 may include hardware, software, or some combination thereof.

In at least one embodiment, as shown in FIG. 12, framework layer 1220 may include a job scheduler 1233, a configuration manager 1234, a resource manager 1236, and/or a distributed file system 1238. The framework layer 1220 may include a framework to support software 1232 of software layer 1230 and/or one or more application(s) 1242 of application layer 1240. The software 1232 or application(s) 1242 may respectively include web-based service software or applications, such as those provided by Amazon Web Services, Google Cloud and Microsoft Azure. The framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1233 may include a Spark driver to facilitate scheduling of workloads supported by various layers of data center 1200. The configuration manager 1234 may be capable of configuring different layers such as software layer 1230 and framework layer 1220 including Spark and distributed file system 1238 for supporting large-scale data processing. The resource manager 1236 may be capable of managing clustered or grouped computing resources mapped to or allocated for support of distributed file system 1238 and job scheduler 1233. In at least one embodiment, clustered or grouped computing resources may include grouped computing resource 1214 at data center infrastructure layer 1210. The resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. One or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216 (1)-1216(N), grouped computing resources 1214, and/or distributed file system 1238 of framework layer 1220. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. Self-modifying actions may relieve a data center operator of data center 1200 from making possibly bad configuration decisions and possibly avoiding underutilized and/or poor performing portions of a data center.

The data center 1200 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1200. In at least one embodiment, trained or deployed machine learning models corresponding to one or more neural networks may be used to infer or predict information using resources described above with respect to the data center 1200 by using weight parameters calculated through one or more training techniques, such as but not limited to those described herein.

In at least one embodiment, the data center 1200 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1100 of FIG. 11—e.g., each device may include similar components, features, and/or functionality of the computing device(s) 1100. In addition, where backend devices (e.g., servers, NAS, etc.) are implemented, the backend devices may be included as part of a data center 1200, an example of which is described in more detail herein with respect to FIG. 12.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1100 described herein with respect to FIG. 11. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

tracking, based at least on first image data obtained using a first image sensor of a machine, a first feature point of a first image corresponding to the first image data to a second feature point of a second image corresponding to the first image data;

tracking, based at least on the first image data and second image data obtained using a second image sensor of the machine, the second feature point of the second image to a third feature point of a third image corresponding to the second image data;

determining, based at least on projecting the first feature point in an environment, that the first feature point of the first image, a first projected point of the second image, and a second projected point of the third image correspond to a same point within the environment; and determining, based at least on a first distance between the second feature point and the first projected point and a second distance between the third feature point and the second projected point, one or more values of one or more parameters for calibrating the first image sensor and the second image sensor.

2. The method of claim 1, further comprising:

determining, based at least on the first distance between the second feature point and the first projected point and the second distance between the third feature point and the second projected point, a cost associated with the one or more values of the one or more parameters; and determining that the cost is less than or equal to a threshold cost, wherein the determining the one or more values of the one or more parameters is based at least on the cost being less than or equal to the threshold cost.

3. The method of claim 2, wherein the determining the cost associated with the one or more values of the one or more parameters is performed using one or more trifocal constraints.

4. The method of claim 1, further comprising:

determining, based at least on the first image data, that a fourth feature point of the first image corresponds to a fifth feature point of the second image; and determining, based at least on the first image data and the second image data, that the fifth feature point of the second image corresponds to a sixth feature point of the third image, wherein the determining the one or more values of the one or more parameters is further based at least on the third feature point, the fourth feature point, and the fifth feature point.

5. The method of claim 1, further comprising:

determining a first pose associated with the machine at a first time associated with the first image, a second pose associated with the machine at a second time associated with the second image, and a third pose associated with the machine at a third time associated with the third image, wherein the determining the one or more values of the one or more parameters is further based at least on the first pose, the second pose, and the third pose.

6. The method of claim 1, wherein the first image sensor includes a first rolling shutter and the second image sensor includes a second rolling shutter, and wherein the method further comprises:

determining a first timestamp associated with the first feature point based at least on a second timestamp indicating a beginning of a generating of the first image and a third timestamp indicating an ending of the generating of the first image;

determining a fourth timestamp associated with the second feature point based at least on a fifth timestamp indicating a beginning of a generating of the second image and a sixth timestamp indicating an ending of the generating of the second image; and determining a seventh timestamp associated with the third feature point based at least on an eighth timestamp indicating a beginning of a generating of the third image and a ninth timestamp indicating an ending of the generating of the third image, wherein the determining the one or more values of the one or more parameters is further based at least on the first timestamp, the fourth timestamp, and the seventh timestamp.

7. The method of claim 1, further comprising:

determining, based at least on third image data obtained using the first image sensor of the machine, that a fourth feature point of a fourth image corresponding to the third image data corresponds to a fifth feature point of a fifth image corresponding to the third image data;

determining, based at least on the third image data and fourth image data obtained using the second image sensor of the machine, that the fifth feature point of the fifth image corresponds to a sixth feature point of a sixth image corresponding to the fourth image data;

determining, based at least on the fourth feature point of the fourth image, the fifth feature point of the fifth image, and the sixth feature point of the sixth image, one or more second values of the one or more parameters for calibrating the first image sensor and the second image sensor; and determining, based at least on the one or more values and the one or more second values, one or more third values of the one or more parameters.

8. The method of claim 1, further comprising:

determining, based at least on third image data obtained using the first image sensor and fourth image data obtained using the second image sensor, that a fourth feature point of a fourth image corresponding to the third image data corresponds to a fifth feature point of a fifth image corresponding to the fourth image data;

determining, based at least on the one or more values of the one or more parameters and the fourth feature point, a line associated with the fourth feature point within the fifth image; and verifying the one or more values of the one or more parameters based at least on the fifth feature point and the line.

9. The method of claim 1, wherein the one or more values of the one or more parameters include one or more of:

one or more first values associated with a rotation for calibrating the first image sensor with the second image sensor;

one or more second values associated with a translation for calibrating the first image sensor with the second image sensor;

one or more third values associated with one or more first lens parameters of the first image sensor; or one or more fourth values associated with one or more second lens parameters of the second image sensor.

10. A system comprising:

one or more processors to:

receive first image data obtained using a first image sensor of a machine and second image data obtained using a second image sensor of the machine, the first image data representing at least a first image and a second image and the second image data representing at least a third image;

determine, based at least on the first image data and the second image data, tracked feature points represented by the first image, the second image, and the third image;

determine, based at least on the first image data and the second image data, projected feature points represented at least by the second image and the third image, the projected feature points corresponding to a point within an environment; and determine, based at least on the at least a portion of the tracked feature points and the projected feature points, one or more values of one or more parameters for calibrating the first image sensor with the second image sensor.

11. The system of claim 10, wherein the one or more processors are further to:

determine, based at least on the at least the portion of the tracked feature points and the projected feature points, a cost associated with the one or more values of the one or more parameters; and determine that the cost is less than or equal to a threshold cost, wherein the one or more values of the one or more parameters for calibrating the first image sensor with the second image sensor are determined based at least on the cost being less than or equal to the threshold cost.

12. The system of claim 11, wherein the determination of the cost associated with the one or more values of the one or more parameters uses one or more trifocal constraints.

13. The system of claim 10, wherein the one or more processors are further to:

determine a first pose associated with the machine at a first time associated with the first image, a second pose associated with the machine at a second time associated with the second image, and a third pose associated with the machine at a third time associated with the third image, wherein the one or more values of the one or more parameters for calibrating the first image sensor with the second image sensor are further determined based at least on the first pose, the second pose, and the third pose.

14. The system of claim 10, wherein the one or more processors are further to:

receive third image data obtained using the first image sensor of the machine and fourth image data obtained using the second image sensor of the machine, the third image data representing at least a fourth image and a fifth image and the fourth image data representing at least a sixth image;

determine, based at least on the first image data, the second image data, and one or more initial values of the one or more parameters, a cost associated with one or more initial parameters for calibrating the first image sensor with the second image sensor; and based at least on the cost, updating the one or more initial values of the one or more parameters to the one or more values of the one or more parameters.

15. The system of claim 10, wherein the system is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implementing one or more large language models (LLMs);

a system for performing conversational AI operations;

a system for generating synthetic data;

a system incorporating one or more virtual machines (VMs);

a system implemented at least partially in a data center; or a system implemented at least partially using cloud computing resources.

16. The system of claim 10, wherein the projected feature points represented by the at least the second image and the third image are determined at least by projecting a tracked feature point, of the tracked feature points, represented by the first image to the point within the environment.

17. One or more processors comprising processing circuitry to:

obtain first image data using a first image sensor of a machine and second image data using a second image sensor of the machine, the first image data representing a first image and a second image and the second image data representing a third image;

tracking, based at least on the first image data and the second image data, a first feature point of the first image to a second feature point of the second image and a third feature point of the third image;

project the first feature point from the first image to determine a first projected point of the second image and a second projected point of the third image; and determine, based at least on the second feature point, the third feature point, the first projected point, and the second projected point, one or more values of one or more parameters for calibrating the first image sensor with the second image sensor.

18. The one or more processors of claim 17, wherein the processing circuitry is further to:

determining, based at least on the second feature point, the third feature point, the first projected point, and the second projected point, one or more costs associated with the one or more values of the one or more parameters, wherein the one or more values of the one or more parameters for calibrating the first image sensor with the second image sensor are determined based at least on the one or more costs.

19. The one or more processors of claim 17, wherein the one or more processors are comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system implementing one or more large language models (LLMs);

a system for performing conversational AI operations;

a system for generating synthetic data;

a system incorporating one or more virtual machines (VMs);

a system implemented at least partially in a data center; or a system implemented at least partially using cloud computing resources.

20. The one or more processors of claim 17, wherein the processing circuitry is further to:

determining a first distance between the second feature point and the first projected point and a second distance between the third feature point and the second projected point, wherein the one or more values of the one or more parameters for calibrating the first image sensor with the second image sensor are determined based at least on the first distance and the second distance.

* * * * *